United States Patent [19]

Madden et al.

[11] Patent Number: 5,602,728

[45] Date of Patent: Feb. 11, 1997

[54] THREE BUTTON PROGRAMMABLE SPRINKLER CONTROLLER

[75] Inventors: Peter R. Madden, Cranleigh; Franciscus B. J. M. Beks, Crawley; Graham J. Nutt, Wallingford, all of United Kingdom; Robert A. Caviar, Leawood, Kans.

[73] Assignee: Watermation Group Ltd., Hants, England

[21] Appl. No.: 301,612

[22] Filed: Sep. 7, 1994

[51] Int. Cl.⁶ .................................................. G05B 11/01
[52] U.S. Cl. ........................ 364/145; 364/146; 239/69
[58] Field of Search ........................... 364/133, 140, 364/141, 143–147, 420, 510; 239/68–70, 63; 137/624.11–624.2, 78.3

[56] References Cited

U.S. PATENT DOCUMENTS

| | | | |
|---|---|---|---|
| 3,599,867 | 8/1971 | Griswold et al. | 239/70 |
| 4,165,532 | 8/1979 | Kendall et al. | 364/420 |
| 4,209,131 | 6/1980 | Barash et al. | 239/68 |
| 4,539,655 | 9/1985 | Trussell et al. | |
| 4,937,732 | 6/1990 | Brundisini | 364/145 |
| 5,025,361 | 6/1991 | Pitman et al. | 364/143 |
| 5,097,861 | 3/1992 | Hopkins | 239/69 |
| 5,187,797 | 2/1993 | Nielsen et al. | 364/146 |
| 5,262,936 | 11/1993 | Faris et al. | 364/140 |
| 5,335,688 | 8/1994 | Caviar . | |

*Primary Examiner*—Roy N. Envall, Jr.
*Assistant Examiner*—Steven R. Garland
*Attorney, Agent, or Firm*—Litman, McMahon and Brown, L.L.C.

[57] ABSTRACT

A three button programmable sprinkler control system includes a control module having an LCD display, a decrement button, an increment button, and a set or select button. In a preferred embodiment, the control module is battery powered, sized for hand holding, and conveniently positionable in and removable from a system cabinet having therein a power transformer and base triac board including a base set of zone valve triacs. The system cabinet is sized to receive an expansion board having a second group of triacs for expanding the number of sprinkler valves which can be controlled. The control module includes a processor having stored therein a control program which is menu based and which is accessed for setting irrigation control parameters by operation of the three switches with reference to icons displayed for the various menus. The control module interfaces with the base triac board and an expansion board by a connector. The control module is also adapted for interfacing to a personal computer for programming irrigation control parameters by way of the personal computer.

10 Claims, 25 Drawing Sheets

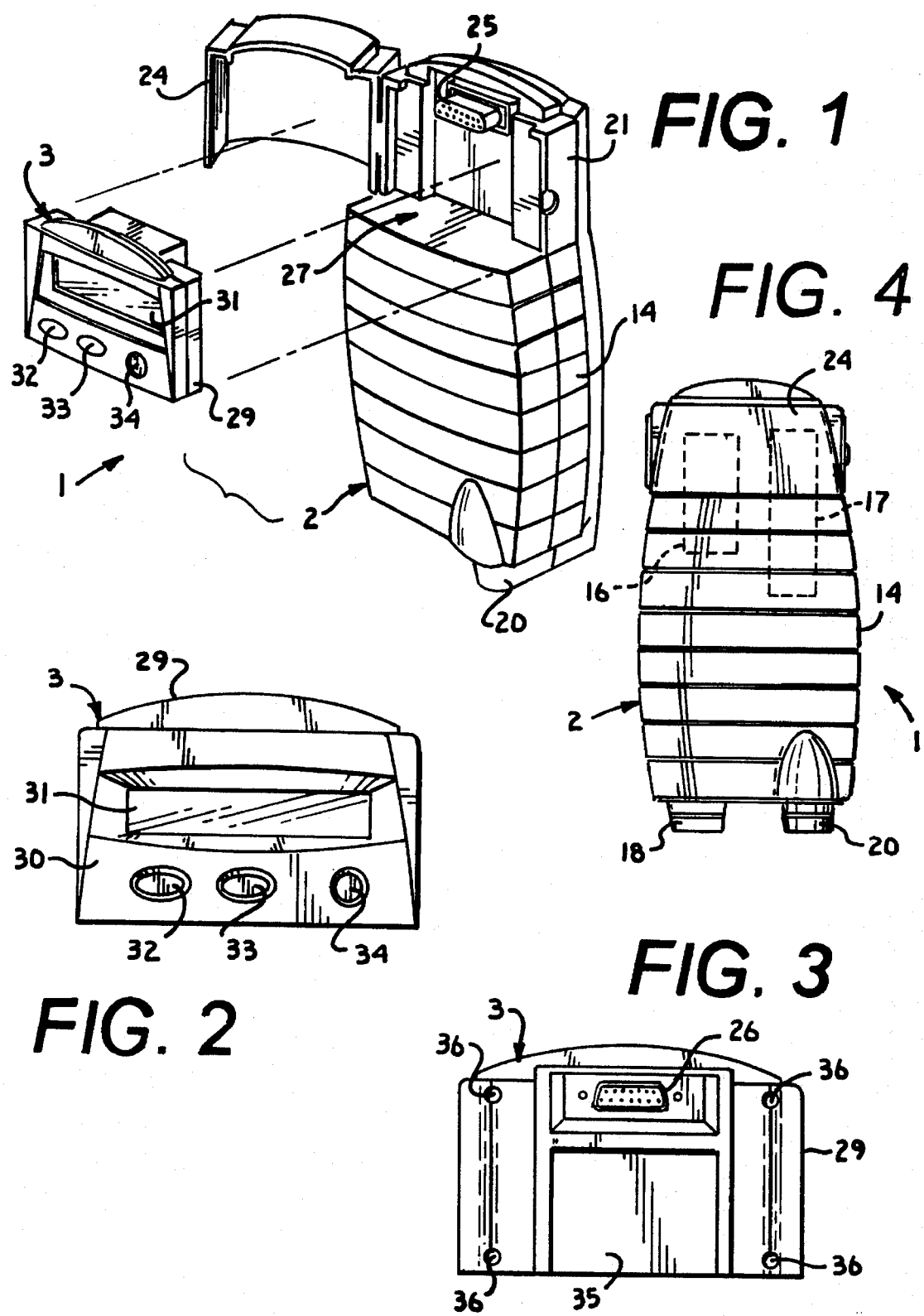

THREE BUTTON PROGRAMMABLE SPRINKLER CONTROLLER

BACKGROUND OF THE INVENTION

Automatic irrigation sprinkler systems have been devised to supplement, or substitute for, natural rainfall in maintaining grasses, flowers, shrubbery, and trees on lawns, golf courses, parks, cemeteries, and the like. In times past, automatic irrigation sprinkler controllers were electromechanical devices which cycled water to various watering zones within the system using electrically driven program wheels having pins and cams which engaged mechanical switches to energize solenoid driven zone valves. Such electromechanical controllers were generally effective and reliable, but mechanically complex and, thus, expensive to manufacture and maintain.

In time, electromechanical irrigation controllers have been supplemented, and eventually supplanted by, analog and digital circuitry. At present, irrigation controllers are almost exclusively digital with programmed microprocessors or microcontrollers operating through solid state power switches, such as triacs. In order to provide the required controlling features, modern digital controllers have, in a sense, replaced mechanical complexity with program and logical complexity. Modern digital irrigation controllers often have complex arrays of displays and programming switches which can be confusing and laborious to understand and operate. Such controllers are often installed in locations where it is not convenient or comfortable to stand, with operating manual in hand, and attempt to program. While large facilities, such as golf courses, can afford to hire consultants and staff capable of programming and adjusting the programs of digital controllers, such outside expertise is often not available to individual homeowners, at least not economically.

Another problem with both older electromechanical controllers and many digital controllers is that they are configured to control a limited number of watering zones. If additional watering zones are needed, a more expensive model with a greater number of controllable zones must be purchased. At least one digital controller is known which has the capability of expanding the number of controlled zones. However, the manner of expansion is by connecting an external expansion module to the existing cabinet by way of an externally accessible connector. In some circumstances, installing an external module on the existing controller cabinet is difficult, if not impossible. Additionally, there are concerns about the reliability of an externally connected module.

SUMMARY OF THE INVENTION

The present invention provides a microprocessor based, programmable irrigation sprinkler control system having a simplified user interface and greatly facilitated expansion capability. In a preferred embodiment, the actual sprinkler controller is a removable module which, when placed in a system cabinet, is interfaced to valve drivers mounted in the cabinet. The control module has a microcontroller or processor, an LCD display, and only three operating switches. A set of batteries provides operating power for the processor which is interfaced directly to, and drives, the display. The control program is stored in ROM within the microcontroller and is menu based such that irrigation control parameters can be set and reviewed by the use of only three switches.

The system cabinet is adapted to house a power transformer which converts line voltage (110, 220, or 240 volts AC) to 24 volts AC for operation of the zone valves. A base driver board has six triacs interfaced to an output port of the microcontroller which sequences an enabling logic state to the triacs to thereby sequence the sprinkler valves. A seventh triac is provided for controlling a master valve which controls the supply of water to the six zones. The control module communicates with the base driver board by way of a DB-15 type connector, a module connector of which is on the control module and a cabinet connector of which is on the cabinet. The six base triacs and master valve triac are interfaced to an output port of the processor by way of buffer circuits and the DB-15 connector.

The base driver board is provided with circuitry to detect the presence of AC power (mains) and the integrity of a fuse on the board (fuse/current or fuse/i). The mains and fuse/i circuits convert the positive halves of the AC current to squared pulses which are applied to an input port of the processor. Because solenoids of the sprinkler valve sets are inductive in nature, a phase shift occurs across a resistor between the fuse and the valves whenever a valve is activated. The processor measures the time of occurrence between corresponding edges of the mains and fuse/i sense signals to measure the inductive phase shift to thereby determine that a zone valve is activated when the corresponding triac is enabled. A rain sensor circuit is provided on the base driver board and interfaced to the processor for the suspension of a watering program if a rain sensor element detects a selected amount of rainfall.

The system cabinet is configured to receive an expansion board with triacs to control an additional number of zone valves, such as six, to thereby provide for economic expansion of the sprinkler control system. The base triac board has an extension connector to which an expansion connector on the expansion board is connected. The extension/expansion connector provides 24 volt AC operating power to the expansion valves. An expansion controller on the expansion board is interfaced to the processor and provides sequenced enable signals to the expansion triacs. The processor communicates with the expansion controller by way of a modified RS232 serial interface through the DB-15 connector and the extension/expansion connector. A presence signal is also communicated from the processor to the expansion controller which functions to disable the expansion controller whenever the control module is removed from the system cabinet.

The processor in the control module includes RAM, ROM, a number of input/output ports, a direct driving LCD display port and a real time clock/calendar as well as the capability of other timing functions or timers derived from an external clock reference. The control program is menu based and is configured for the entry of irrigation control parameters, setting of times, and the like using a very simple set of switches. The control module is provided with an increment switch, a decrement switch, and a set or select switch. In general, the increment and decrement switches are menu cycle switches which, in cooperation with the display, cycle forward and backward through the available menus and through parameters within a selected menu. The set or select switch selects a current menu and selects parameters within a menu. Additionally/pressing the set switch for five seconds causes an escape function to occur to exit back to the main menu. In the case of nested menu options, pressing the set switch causes the program to go back one level.

The program provides for a high degree of flexibility in irrigation programs to accommodate the layout of vegetation in a landscape, variations in activities on various days of the week, variations in rainfall, and odd/even watering ordinances which are periodically invoked in some locales. Additionally, provisions are made for testing the programs by sequencing quickly through the zone valves with or without water available and for manual operation of the zone valves. The control program provides for multiple watering programs, each with multiple starting times to selected zones for selected durations. The control program checks for programming conflicts, such as starting times overlapping durations which would still be occurring and adjusts the later starting time to occur after completion of the current cycle. The controller may be programmed to water daily; every second, third, fifth, or seventh day; odd or even calendar days; every second, third, fifth, or seventh odd day; every second, third, fifth, or seventh even day; or specific days of the week. The program includes a budget function which allows all duration times in a given program to be varied a selected percentage to adjust for underwatering or overwatering.

The type of sprinkler valves which the system of the present invention is intended to control are of a type which use a solenoid to control a pilot valve which opens ports in the mechanism to allow hydraulic pressure in the water lines to actually open and close the main valve. Such valves have the advantage of requiring a smaller solenoid than would be required if the solenoid controlled the main valve, thereby allowing control devices with lower dissipation ratings; however, the operating time of such valves is neither instantaneous nor constant, but depends on the water pressure in the water lines. Because of this, it is necessary to delay the opening of a given zone valve until the previously activated zone valve closes or nearly closes. Otherwise, the first valve may never close completely or the second one open completely. The control program of the system of the present invention has a variable zone delay (VZD) feature which allows the user to select from a range of delays between the closing of one zone valve and the opening of the next zone valve in the sequence to compensate for possible variations in available water pressure.

The presence of the RS232 serial interface on the control module and the configuration of the module component of the DB-15 connector allows the control module to be connected to the serial interface of a personal computer whereby software executing in the personal computer enables programming of the control module and the review and testing of such programs. This allows a homeowner to bring the control module in to a vendor of irrigation services for assistance in programming, program debugging, module testing, and the like or allows the vendor to quickly program a controller module in the field using a portable computer, such as a laptop or notebook type computer. Additionally, the homeowner can obtain software for programming the control module by connection of the module to the homeowner's personal computer.

In a modified embodiment of the present invention, the control module board having the same programming and control features as the removable control module is permanently mounted in a system cabinet, as for commercial type applications. Such an internal controller system is provided with internal expansion capability which may include a greater number of expansion zones than are available for the removable module system. The internal controller system is not conveniently interfaced to a personal computer; however, in most other respects the internal controller system is substantially similar in configuration and operation to the removable module sprinkler controller system.

OBJECTS AND ADVANTAGES OF THE INVENTION

The principal objects of the present invention are: to provide an improved control system for irrigation sprinkler systems; to provide such a control system with greatly simplified programming capability and user interface; to provide such a control system employing a menu based control program which cooperates with a display and a minimum number of key switches to enable convenient setting of irrigation control parameters; to provide, particularly, a control system with a specially configured LCD display in combination with a pair of menu cycling switches and a menu set or select switch; to provide such a control system including a menu increment switch and a menu decrement switch which are operable to cycle forward and backward among a plurality of programming menus or within a selected menu and a set or select switch to select a current menu or a parameter within a selected menu; to provide such a control system wherein a controller board is battery operated and is interfaced with a base driver board in a system cabinet having solid state power drivers, such as triacs, which are selectively enabled by a processor on the controller board to transfer valve operating power from a power transformer in the cabinet to the sprinkler valves; to provide such a control system wherein the base driver board has an extension connector to receive a mating expansion connector on an expansion board which is mounted in the system cabinet and which has power drivers thereon, such as triacs, for controlling an additional plurality of sprinkler zone valves; to provide such a control system wherein the expansion drivers are enabled by an expansion controller which communicates with the main processor by way of an RS232 serial interface; to provide such a control system having the capability of sensing selected conditions in the system, such as the presence of AC power, a blown fuse on the base driver board, the occurrence of rain in excess of a selected amount, and the actual operation of a solenoid intended to be activated; to provide such a control system which senses the actual operation of a valve solenoid intended to be activated by measuring an inductive phase shift in current which occurs when a valve solenoid is activated; to provide such a control system with a user selectable variable zone delay which delays the opening of a zone valve until the closing of a previously sequenced zone valve; to provide such a control system having a high degree of flexibility in irrigation programming, including a plurality of independent watering programs, each with a plurality of starting times for selected watering zones for selected durations; to provide such a control system wherein the control program has a high degree of flexibility in programming the days on which watering will occur; to provide such a control program with the ability to increase or decrease all the watering durations within a program by a selected percentage; to provide such a control program with the capability of resolving programming conflicts, such as the overlapping of watering durations, by delaying the later duration until a current duration has completed; to provide such a control program with a default program which cycles through all zones for a set duration at a given starting time in case program data is lost; to provide such a control program with the capability of testing the programs entered; to provide a preferred embodiment of such a control system in which the system controller is housed in a handheld module which is removable from the system cabinet and which interfaces with the base driver board by way of a multiple contact connector when the control module positioned in the system cabinet; to provide such a control system wherein the control module is capable of being programmed and programs can be tested with the module removed from the system cabinet; to provide such a control system wherein the control module can be connected to a personal computer for programming, program analysis, and module testing; to provide such a control system which is adaptable to a wide variety of irrigation sprinkler control applications, including household and commercial types of sprinkler systems; and to provide such an irrigation sprinkler control system which is economical to manufacture, which is rugged and convenient in use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an exploded perspective view at a reduced scale of a three button programmable sprinkler control system which embodies the present invention, shown with a control module separated from a system cabinet.

FIG. 2 is a somewhat enlarged front elevational view of the removable control module of the system.

FIG. 3 is a rear elevational view of the control module.

FIG. 4 is front elevational view of the system cabinet with a base driver board and an expansion board of the system shown in phantom.

DETAILED DESCRIPTION OF THE INVENTION

Figure 5:
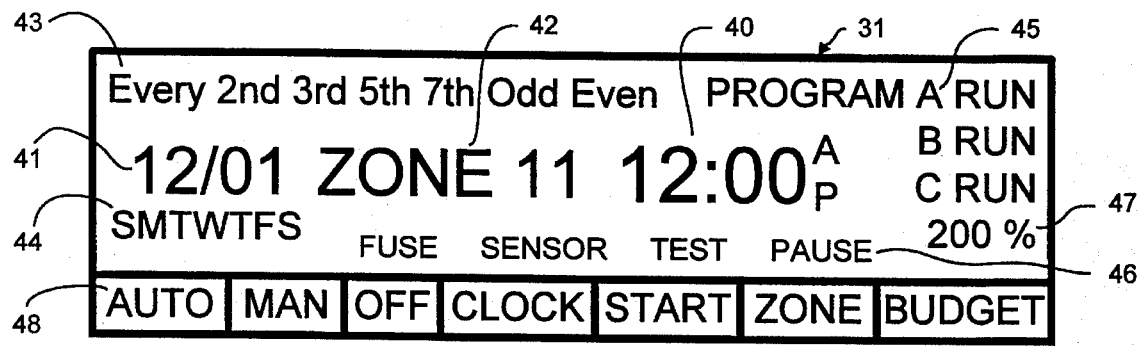
FIG. 5 is an enlarged elevational view of a liquid crystal display of the control module with all elements activated.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates an irrigation sprinkler control system which embodies the present invention. The system 1 generally includes a system cabinet 2 and a control module 3 normally positioned within the cabinet 2, but removable therefrom. In general, the system 1 is used to control a plurality of zone valves 4 (FIG. 6) of an irrigation sprinkler system 5 to thereby cycle irrigating water to irrigation zones of the sprinkler system 5.

The system cabinet 2 includes a lower main enclosure 14 sized to house an internal power transformer 15 (FIG. 9) and a portion of a base driver board 16. The system 1 may alternatively be adapted for use of an external power transformer (not shown). The main enclosure 14 also has space provided therein to receive a portion of an expansion board 17. A lower end of the cabinet 2 has a power cable port 18 for connection of the power transformer 15 to a source 19 of AC power (FIG. 6) and a control cable port 20 for connection to the valves 4 of the sprinkler system 5.

An upper extension 21 of the cabinet 2 receives portions of the base driver board 16 and, if present, the expansion board 17. A cabinet door 24 is hingedly connected to the upper extension 21 and can be opened for access to the control module 3. A cabinet component 25 of a DB-15 type connector is mounted on a wall of the upper extension 21 and mates with a module component 26 (FIG. 3) of the DB-15 connector which is mounted on a rear wall of the control module 3. The upper extension 21 and the door 24 cooperate to define a control module compartment 27 within the system cabinet 2. In the system 1, the control module 3 is easily removable from, and replaceable in, the system cabinet 2 and is only held within the compartment 27 by engagement of the module component 26 of the DB-15 connector with the cabinet component 25 thereof.

Referring to FIGS. 2 and 3, the control module 3 is sized to be conveniently held in the hand, and includes a control module housing 29 having a front wall 30 provided with a liquid crystal display or LCD 31, a menu decrement switch 32, a menu increment switch 33, and a set or select switch 34. A rear wall 35 of the module housing 29 is provided with the module connector 26 and with screws 36 for removal of the rear wall 35 to replace batteries 37 (FIG. 7) of the module 3. The illustrated module 3 is powered by three AA sized alkaline batteries.

FIG. 5 illustrates the LCD 31 with all elements activated. Normally, all display elements are only activated for a short time during initial power up, as after the batteries 37 have been replaced. The illustrated display 31 has a clock region 40, a calendar date region 41, a zone region 42, a day interval or frequency region 43, a day of the week region 44, a program region 45, an indicator region 46, a budget percentage region 47, and a horizontal menu bar 48 including a plurality of menu regions.

Alternatively, other types and configurations of displays and display devices could be employed in the control system 1.

Figure 7:
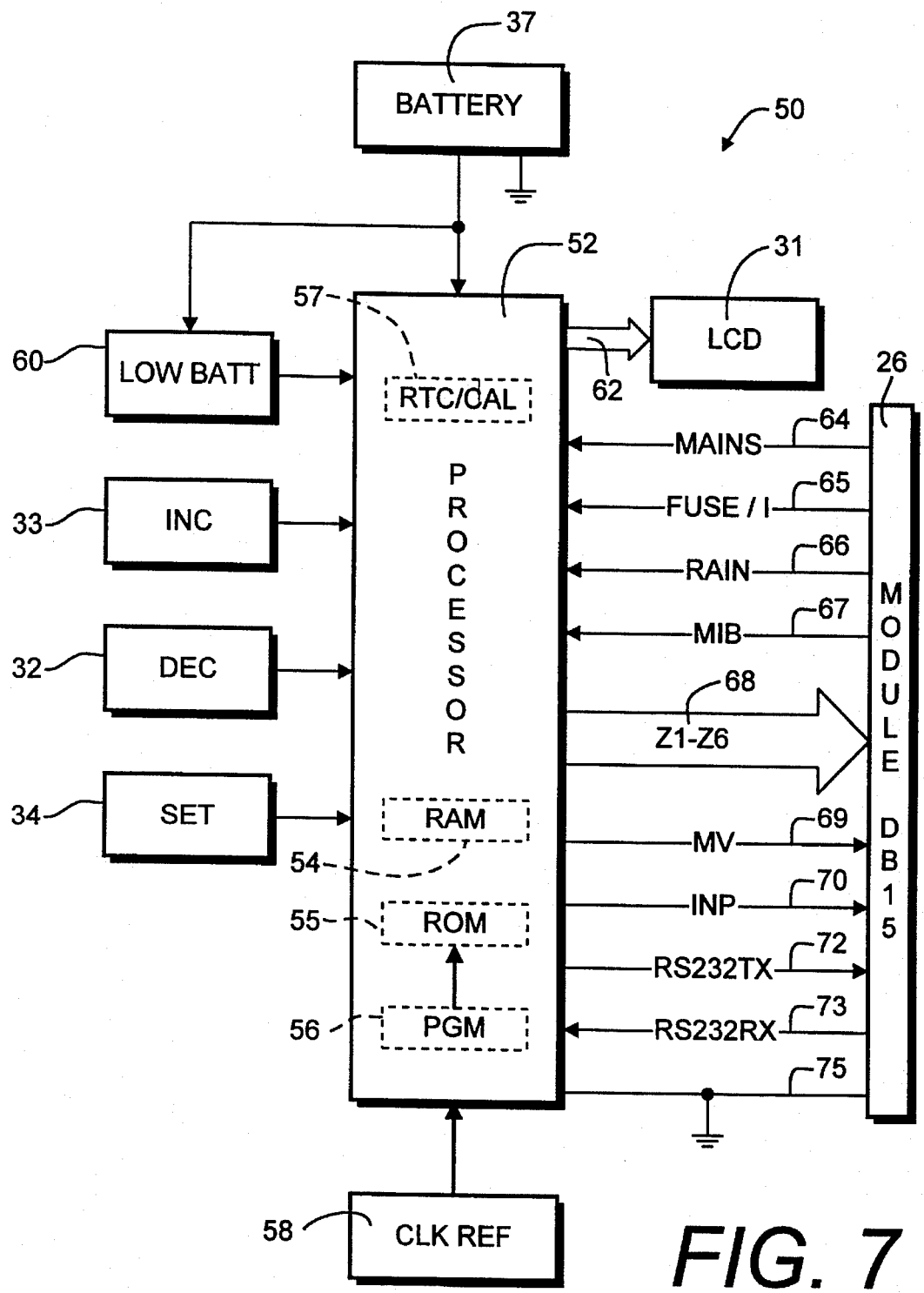
FIG. 7 is a block diagram illustrating the principal components of the controller board of the control system.

FIG. 7 illustrates the principal operating components of the control module 3 which are mounted on a controller board 50 which, in turn, is mounted within the control module housing 29. The controller board 50 includes a microcontroller or processor 52 which functions as the principal control element of the system 1. The processor 52 includes RAM 54, ROM 55 with a control program (PGM) 56 stored therein, and a real time clock/calendar (RTC/C) 57 which derives its timekeeping functions from an external clock reference (CLK REF) 58. The real time clock/calendar 57 may be implemented as actual circuitry within the processor 52 or may be emulated in software. The controller board 50 has a low battery voltage sensor circuit (LO BATT) 60 which monitors the voltage of the batteries 37 and, when the voltage drops below a selected level, causes the processor 52 to activate a low battery indicator (not shown) on the display 31. The processor 52 has a display port 62 with internal circuitry for direct interfacing to the display 31. There are many types of processors 52 which are suitable for use in the system 1 which would occur to one skilled in the art. Therefore, the system 1 is not intended to be limited to any particular microprocessor or microcontroller for implementation of the processor 52.

The processor 52 has the decrement, increment, and set switches 32, 33, and 34 interfaced to an input port thereof. The module component 26 of the DB-15 connector is mounted on the controller board 50 and is interfaced to a number of input and output ports of the processor 52. A mains sensor line 64, a fuse/current (fuse/i) sensor line 65, a rain sensor line 66, and a module in box or cabinet (MIB) line 67 are interfaced to an input port of the processor 52. Each of the lines 64–67 is pulled up to 4.5 volts by a respective pull-up resistor (not shown). Six zone triac enable lines (Z1–Z6) 68, a master valve triac enable line (MV) 69, and a module present or presence line (INP) 70 are interfaced to individual lines of an eight bit output port of the processor 52. An RS232 transmit line (RS232TX) 72 and an RS232 receive line (RS232RX) 73 are interfaced to a serial port of the processor 52. Finally, a ground or reference line 75 is provided between the processor 52 and the module connector 26.

Figure 9:
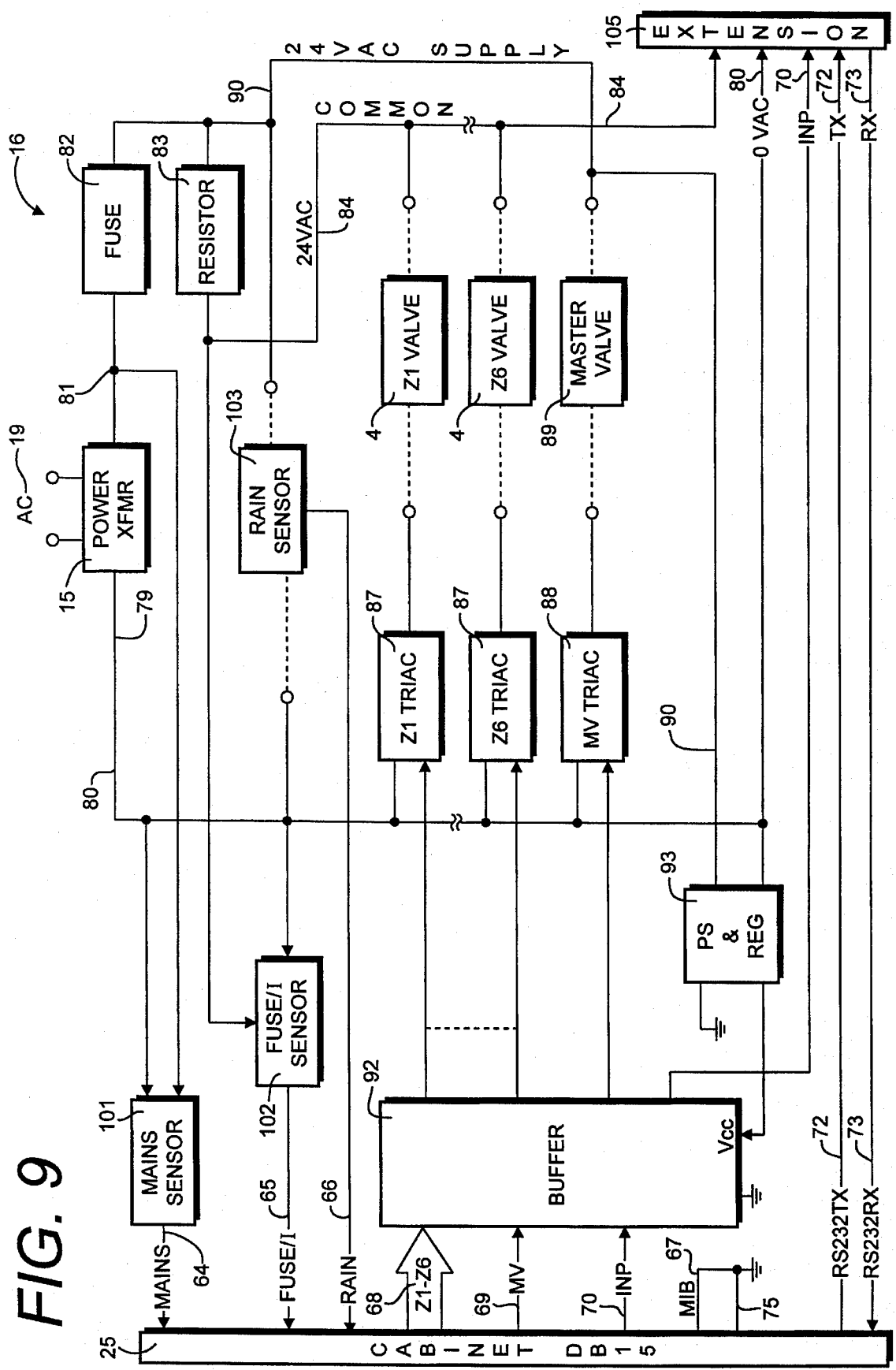
FIG. 9 is a block diagram illustrating the principal components of a base driver board of the system.

FIG. 9 illustrates the base driver or triac board 16 which has the power transformer 15 and the cabinet component 25 of the DB-15 connector mounted thereon. The stepdown transformer 15 is connected to a source 19 of AC power or power mains and provides 24 volts AC at its output for operation of the zone valves 4. The transformer 15 may be adapted for a nominal input voltage of 110, 220, or 240 volts, according to the available AC power. One terminal 79 of the transformer 15 forms a zero volt or AC reference line 80, while the opposite terminal 81 is connected through a fuse 82 and a resistor 83 to form a 24 volt common line 84 of the board 16.

Six zone valve control triacs (Z1 triac through Z6 triac) 87 and a master valve control triac (MV triac) 88 are mounted on the board 16 and have one terminal of each connected to the zero volt line 80. The solenoids of the zone valves 4 are connected between the opposite terminals of the zone triacs 87 and the 24 volt common line 84. A solenoid of a master valve 89 is connected between the master valve triac 88 and a 24 volt supply line 90 which is connected between the fuse 82 and resistor 83. The triacs 87 and 88 are enabled by gate signals received through buffers of a buffer chip 92 respectively from the zone triac enable lines 68 and the master valve enable line 69. The buffer chip 92 receives operating power from an on-board power supply and regulator circuit (PS & REG) 93 which is connected across the zero volt line 80 and the 24 volt supply line 90.

A mains sensor circuit 101 is connected across the output terminals 79 and 81 of the power transformer 15. A fuse/current sensor circuit (fuse/i) 102 is connected between the zero volt line 80 and the 24 volt common line 84. A rain sensor circuit 103 is connected between the zero volt line 80 and the 24 volt supply line 90. In general, the mains sensor 101 detects the presence of AC power available to the power supply and regulator circuit 93 supplying DC power to the buffer 92 which carries enable signals to the valves 4 and 89. The fuse/i sensor 102 detects if the fuse 82 has blown, and the rain sensor 103 detects rainfall in excess of a selected level. The illustrated sensor circuits 101–103 are transistor circuits which are biased to switching modes. The mains, fuse/i, and rain signal lines 64, 65, and 66 are connected through the DB-15 connector 25/26 to terminals of an input port of the processor 52. The module in box (MIB) line 67 is connected to the ground line 75 on the cabinet component 25 of the DB-15 connector so that when the control module 3 is present in the system cabinet 2 and the components 25 and 26 connected together, the MIB line 67 is pulled to ground, which the processor can test to determine that the control module 3 is present in the cabinet 2.

When the nondesired condition for any of the sensor circuits 101–103 exists, the transistor in the corresponding circuit 101–103 does not conduct, whereby the respective signal line 64–65 is pulled up to a continuous 4.5 volts DC from the batteries 37. When the desired condition exists, the respective transistor switches to conduction on the positive cycles of the 24 volt AC current whereby the signal on the corresponding signal line 64–66 consists of pulses of zero volts in the negative direction from the 4.5 volt reference. The presence of a continuous DC level indicates the absence of AC power, a blown fuse, or rain on the signal lines 64, 65, or 66 and causes the processor 52 to suspend the current watering program, as will be detailed further below. The rain sensor circuit 103 employs an external, normally close-circuited rain sensor element (not shown) which open circuits in response to a selected degree of moisturization from rainfall.

The solenoids (not shown separately) within the zone valves 4 are inductive in nature. Because of this, there is a phase shift between the current through and the voltage across a solenoid when activated. As connected on the board 16, the mains sensor 101 and fuse/i sensor 102 sense opposite sides of the resistor 83. Since the resistor 83 and any activated zone valve 4 are serially connected and, thus, carry the same current, the phase shift caused by activation of a zone valve 4 can be considered to be a phase difference in the voltages on opposite sides of the resistor 83. The processor 52 measures the phase shift occurring in response to activation of a zone valve 4 by timing between the occurrence of corresponding edges of the pulses of the mains signal and the fuse/i signal. By measuring a phase shift instead of simply sensing the presence of current flowing toward a zone valve solenoid, the processor 52 can distinguish between actual activation of a zone valve solenoid and current flow from other causes, such as incorrect wiring or an electrical fault in another part of the system 1.

Figure 6:
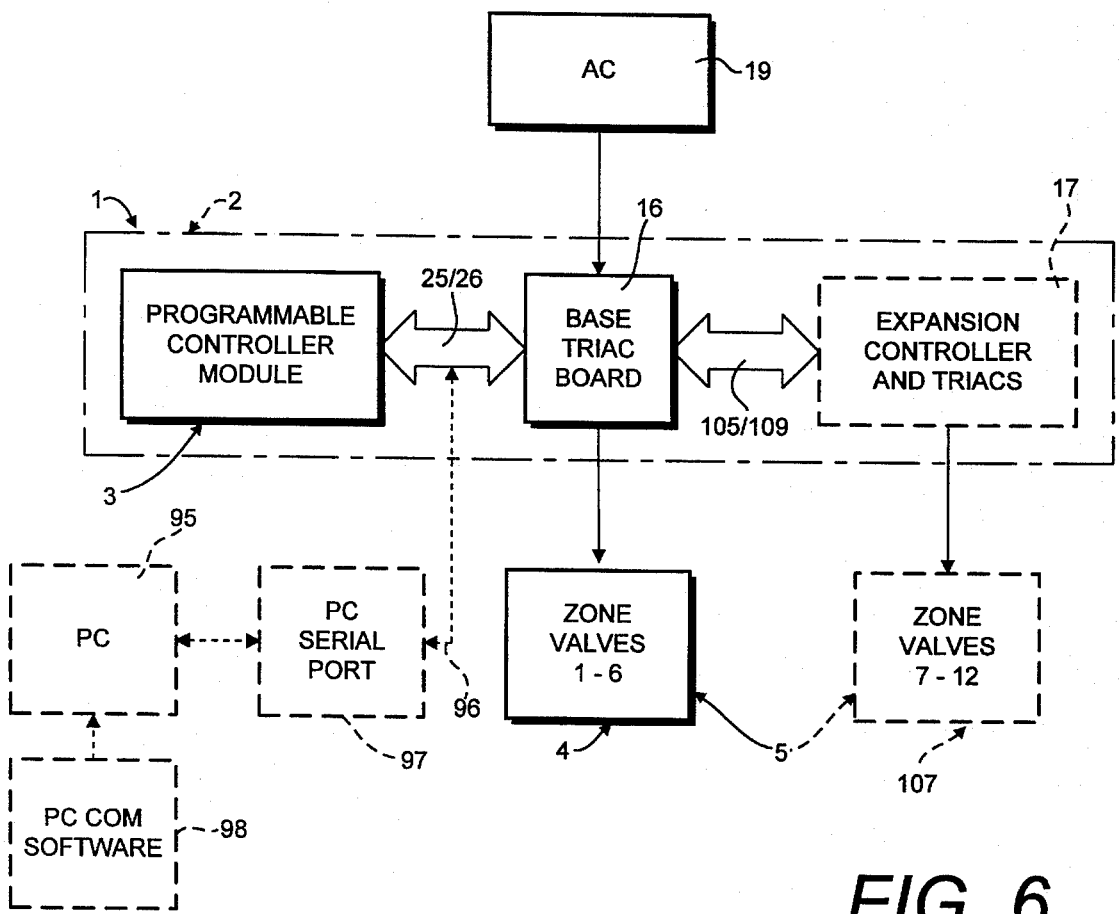
FIG. 6 is a simplified block diagram illustrating the control system of the present invention connected to a set of sprinkler zone valves, with an expansion board and expansion valves and a personal computer interfaced to the system shown in phantom lines.
Figure 8:
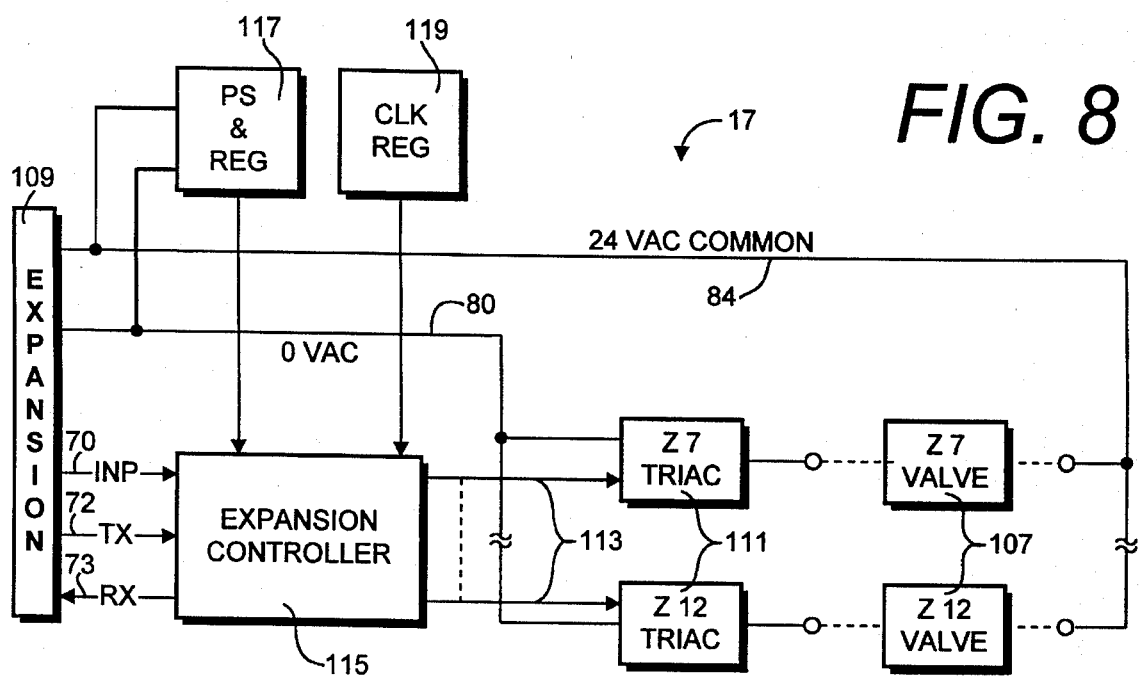
FIG. 8 is a block diagram illustrating the principal components of the expansion board of the system.

The base triac board 16 has an extension connector 105 thereon to provide for the connection the expansion driver or triac board 17 to the processor 52. The extension connector 105 carries the zero volt line 80 and the common line 84 for operating expansion zone valves 107 (FIGS. 6 and 8). The extension connector 105 also carries the module present signal (INP) 70 which is buffered by the buffer chip 92, the RS232 transmit line 72, and the RS232 receive line 73.

Referring to FIG. 8, the expansion driver or triac board 17 includes an expansion connector 109 which connects with the extension connector 105 when an expansion board 17 is installed in the system cabinet 2. The expansion connector 109 carries the zero volt AC line 80, the common AC line 84, the presence line 70, the RS232 transmit line 72, and the RS232 receive line 73. The illustrated expansion board 17 has six zone triacs (Z7 triac through Z12 triac) 111 mounted thereon, each with one terminal connected to the zero volt line 80. An opposite terminal of each triac 111 is available for the connection of a zone valve (Z7 valve through Z12 valve) 107 thereto. The triacs 111 are sequentially enabled by gate signals on enable lines 113 from an expansion controller 115. Alternatively, the expansion board 17 could provide expansion to a greater or fewer number of irrigation zones than the six illustrated.

The illustrated expansion controller 115 is a simplified type of microprocessor or microcontroller which operates as a slave processor to the main processor 52. A suitable processor for use as the expansion controller 115 is the PIC16C54XTP. Alternatively, other devices could be employed as the expansion controller 115, such as other types of peripheral interface controllers or adapters. The expansion controller 115 receives operating power from a power supply and regulator circuit (PS & REG) 117 and a timing reference from a clock reference (CLK REF) 119, such as a crystal or ceramic resonator. Zone activation commands are received by the expansion controller 115 from the processor 52 by way of an RS232 serial interface having the RS232 transmit line 72 and the RS232 receive line 73. The INP line 70 is pulled to ground (not shown) between the expansion connector 109 and the expansion controller 115. When the control module 3 is present in the cabinet 2 and the expansion board 17 is present, the INP line 70 is pulled to 4.5 volts and provides an enable signal for the expansion controller 115. When the INP signal is pulled low by removal of the control module 3 from the system cabinet 2, the expansion controller 115 is inhibited from enabling any of the triacs 111. The expansion board 17 provides an economical means for expanding, internal to the system cabinet 2, the number of irrigation zones controlled by the system 1.

Referring to FIG. 6, the control module 3 is adapted for interfacing to a personal computer or PC 95 by connection of an adapter cable 96 between the module component 26 of the DB-15 connector and a serial port 97 of the PC 95. The adapter cable 96 connects the RS232TX line 72, the RS232RX line 73, and the ground reference 75 to the appropriate positions of a DB-9 connector (not shown) which is the current standard connector for a PC serial port 97. The adapter cable 96, when connected to the module component 26 of the DB-15 connector, connects the INP line 70 to ground. A ground level on the INP line 70 is used by the processor 52 to determine that the adapter cable 96 has been connected to the control module 3.

The serial interface of the control module 3 is a modified serial interface in that it can read the standard +12 and −12 volt levels from the PC serial port 97 but only transmits 0 (zero) and +5 volts. Because this modification reduces the noise immunity of the module transmitted signal, an adapter cable 96 of minimal length is recommended. When the control module 3 is in the system cabinet 2 and an expansion board 17 is present, the processor 52 acts as the master processor and the expansion controller 115 acts as a slave processor. That is, the processor 52 always initiates communication with the expansion controller 115. When the control module 3 is interfaced to the PC 95, the PC 95 acts as the master and always initiates communication with the control module 3.

Figure 14:
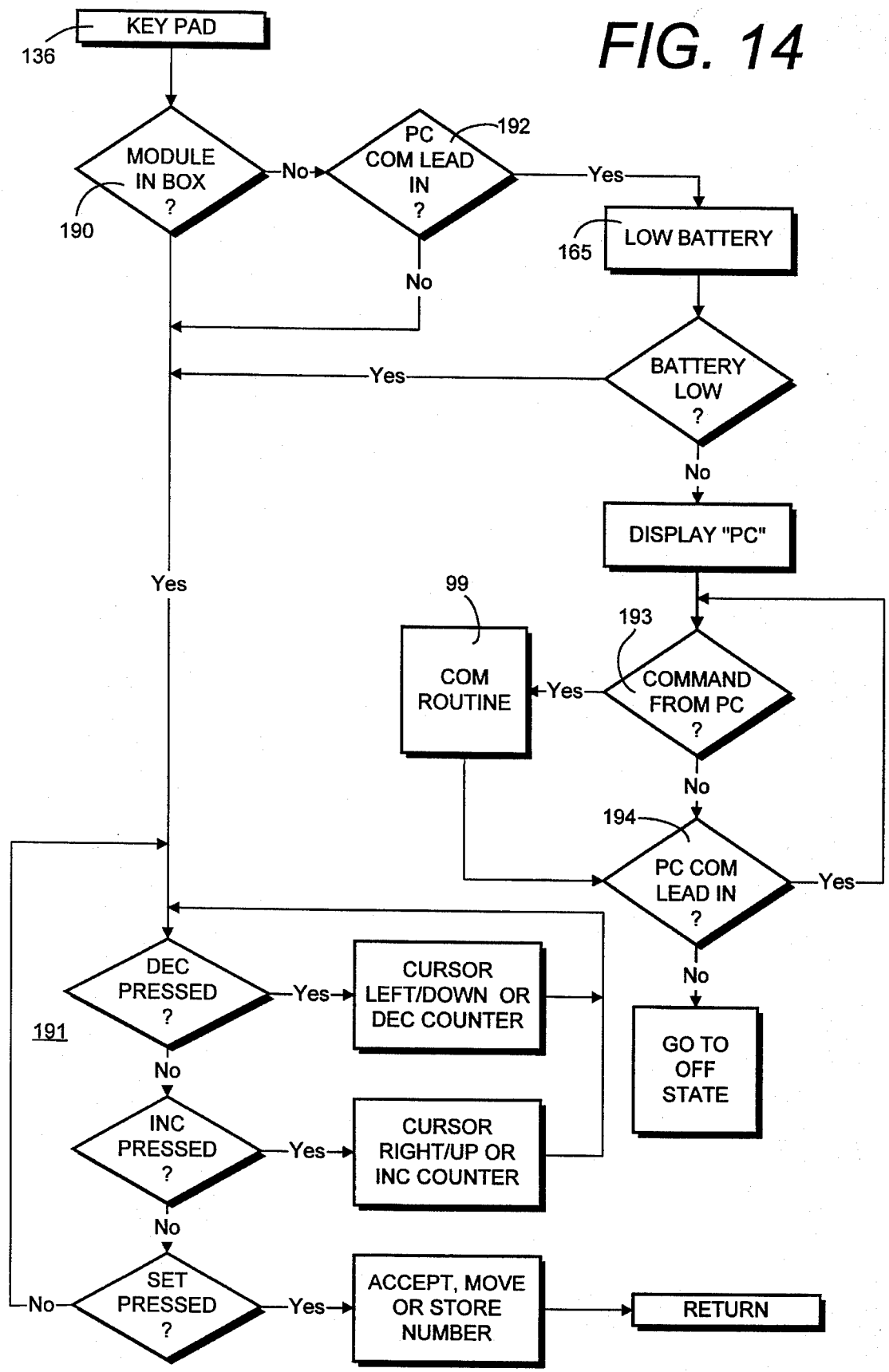
FIG. 14 is a flow diagram illustrating a keypad routine of the system, which includes a test for connection of the control module to a personal computer and routines for communicating with the personal computer thereby.
Figure 15:
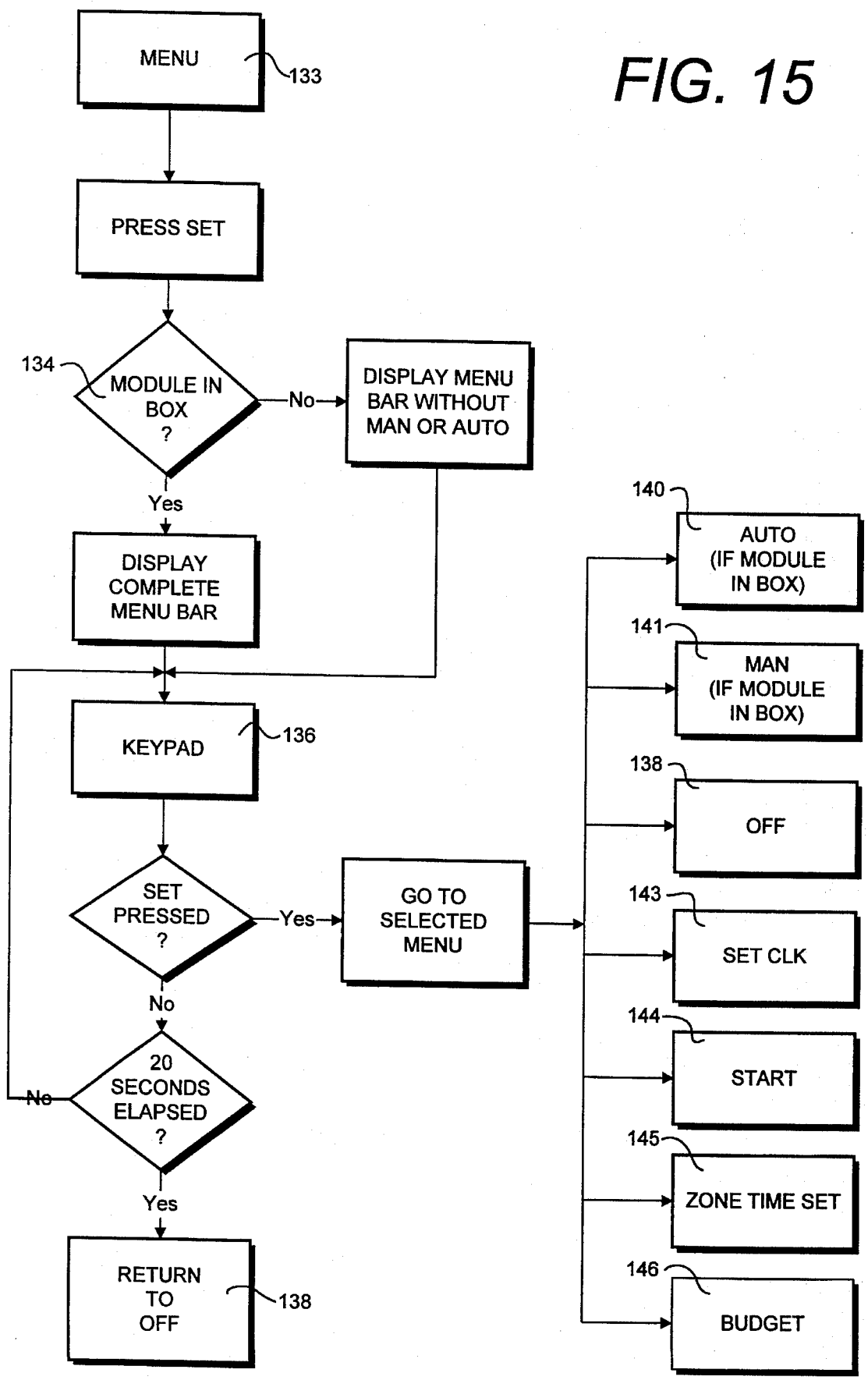
FIG. 15 is a flow diagram illustrating a main menu routine of the system.

The control module 3 communicates with the PC 95 using the same protocol used with the expansion controller 115, that is, half duplex, at 1200 Baud with one start bit and one stop bit, no parity, and fixed length communication frames. Handshaking is not supported, but checksum error detection is employed. The PC 95 communicates with the control module 3 using special communication software 98, while the control module 3 uses a module communication routine (COM routine) 99 (FIG. 14), which is a component of the module control program 56.

The processor 52 executes the control program 56 to control the zone sprinkler valves 4 and 107 and to enable programming of irrigation control parameters. FIGS. 10–27 diagrammatically illustrate the principal routines of the control program 56. Generally, programming of the control module 3 is accomplished by operation of switches 32–34 with reference to the elements or icons 40–48 which are displayed or flashing on the display 31.

Figure 10:
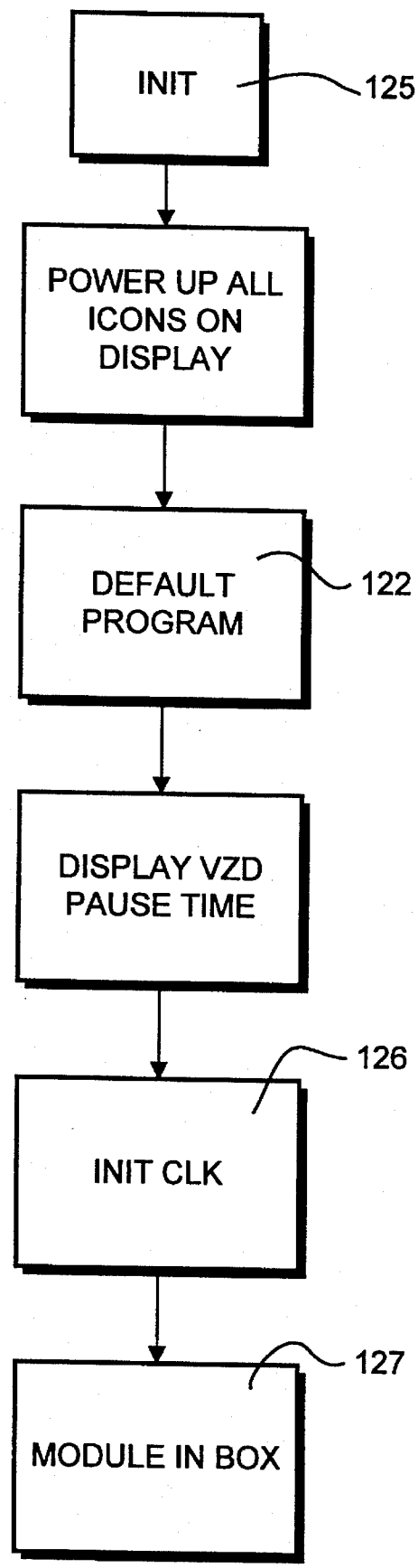
FIG. 10 is a flow diagram illustrating an initialization routine of the control program of the sprinkler control system of the present invention.

FIG. 10 illustrates an initialization (INIT) routine 125 which is executed whenever the batteries 37 are replaced.

Figure 11:
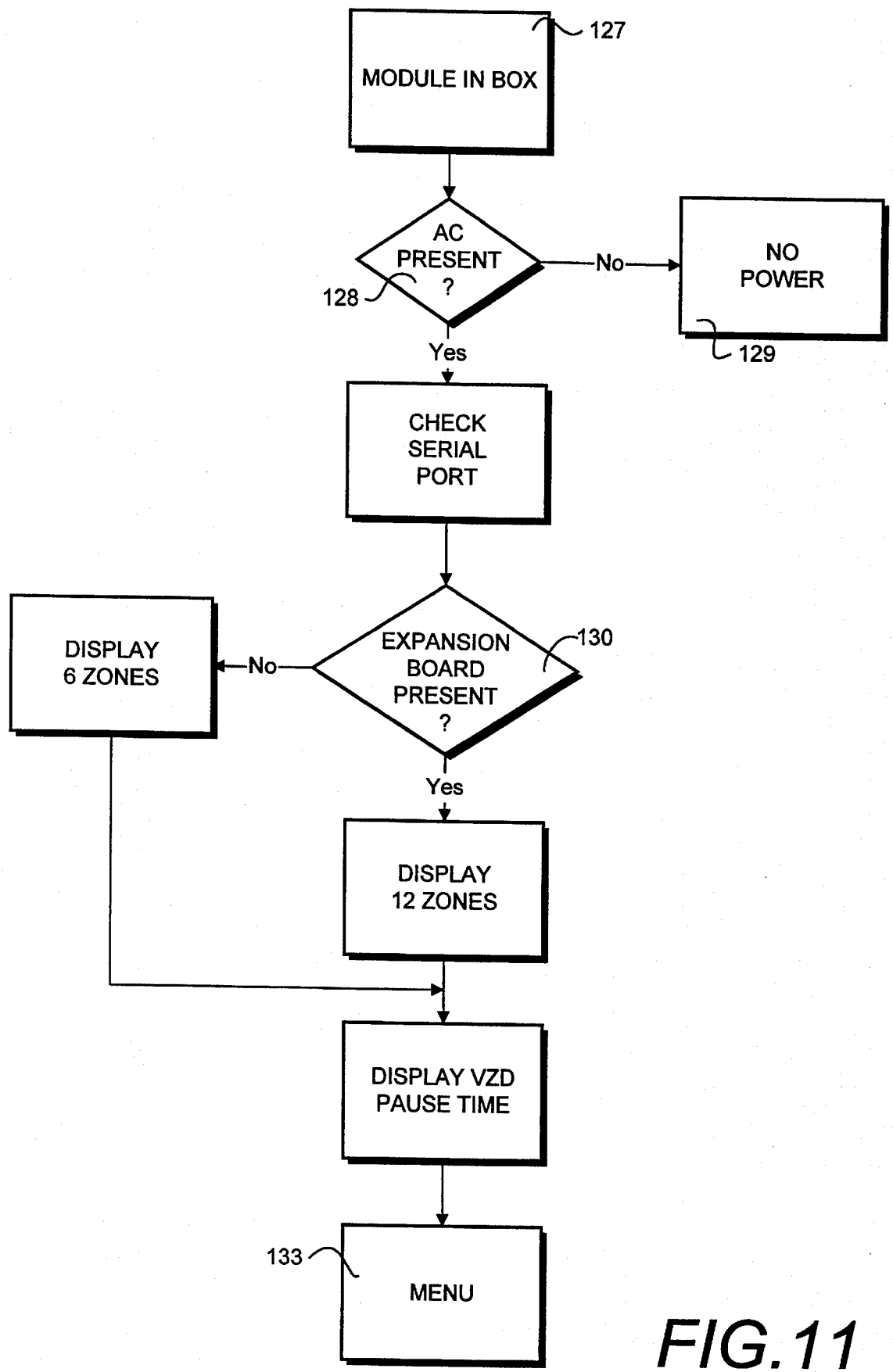
FIG. 11 is a flow diagram illustrating a module in box routine of the system which checks for the presence of the control module in the system cabinet.
Figure 12:
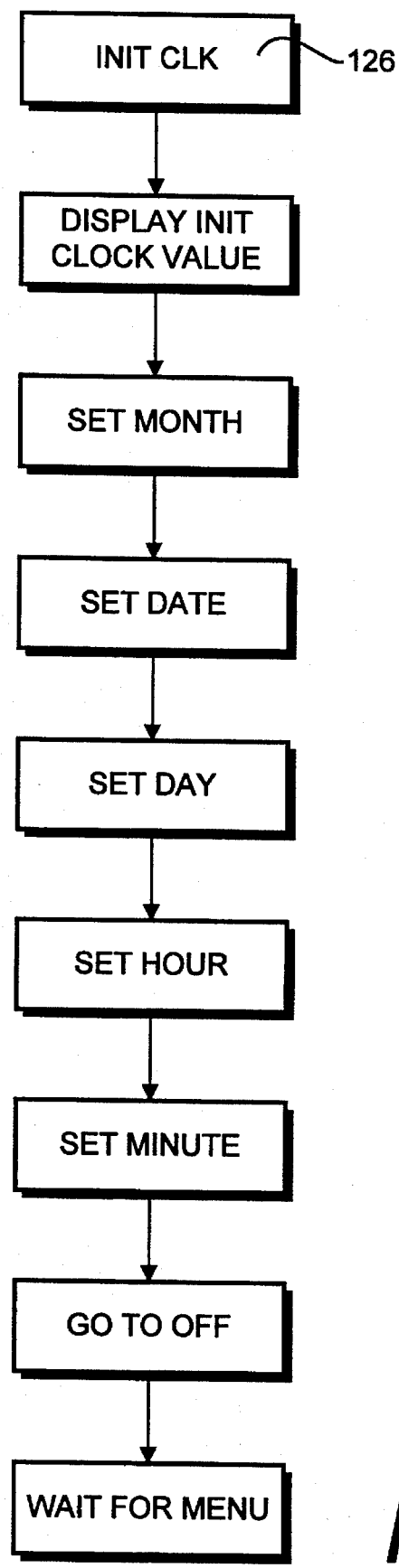
FIG. 12 is a flow diagram illustrating a clock initialization routine of the system.
Figure 13:
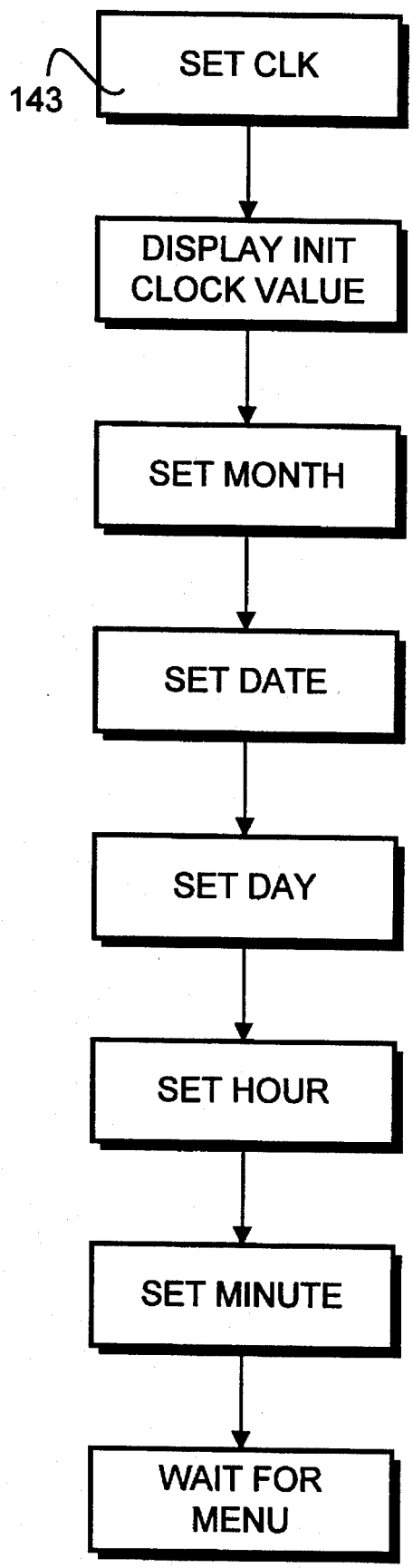
FIG. 13 is a flow diagram illustrating a clock setting routine of the system.

The processor activates all the icons 40–48 on the display 31 for a short time, creates a default program 122, displays the variable zone delay (VZD) time, and goes into a clock initialization (INIT CLK) routine 126 (FIG. 12). The default program 122 is designated program A and has a single start time of 4:00 AM, a duration of five minutes per zone, and a day interval of every day. The variable zone delay feature of the system 1 delays the opening of a subsequent zone valve in a sequence until the current valve has closed to allow for the use of pilot type valves which use water pressure to actually open and close the main valves. An example of such a valve is disclosed in U.S. Pat. No. 5,335,688, issued Aug. 9, 1994, which is incorporated herein by reference. After clock initialization 126, the main initialization routine 125 goes to a module-in-box routine 127 (FIG. 11).

The module-in-box routine 127 determines if the control module 3 is present in the system cabinet 2 by checking the module in box (MIB) line 67. If the MIB signal is false, the routine 127 enters a no-power routine 129 (FIG. 26) by way of an "AC present" decision 128. Otherwise, the routine 127 checks the serial port 72/73 to determine at 130 if an expansion board 17 is present. If not, an indication of six zones present is displayed; if an expansion board 17 is present, an indication of the maximum number of zones (such as twelve) is displayed. Thereafter, the variable zone delay time is displayed, and a menu routine 133 (FIG. 15) is entered. Within the menu routine 133, the set button 34 is pressed, and the presence of the module 3 in the cabinet 2 is checked at 134. If the module 3 is present, the menu bar 48 is displayed without the manual (MAN/OFF) or automatic (AUTO) regions displayed. If the module 3 is in the cabinet 2, the complete menu bar 48 is displayed. A keypad routine 136 (FIG. 14) is entered wherein, if the set button 34 has not been pressed within twenty seconds, an "OFF" state is entered at 138, in which the time, date, and day of the week are displayed, and the program 56 waits. If a program indicated by one of the regions flashing on the menu bar 48 has been selected during execution of the keypad routine 136, the selected program is entered. An AUTO routine 140 (FIG. 16) or a MAN (manual) routine 141 (FIG. 18) can be entered only if the control module 3 has been detected in the system cabinet 2 and AC power is present. In any case, the OFF state 138, a set clock (SET CLK) routine 143 (FIG. 13), a start routine 144 (FIG. 19), a zone time set routine 145 (FIG. 21), or a budget routine 146 (FIG. 22) can be entered.

The clock initialization routine 126 (FIG. 12) and clock setting routine 143 (FIG. 13) are similar and provide for setting the real time clock/calendar 57 of the processor 52. It should be noted that the functions of the real time clock/calendar 57 may be implemented by actual circuitry within the processor 52 or by a software emulation thereof. Generally, the month, date, day of the week, hours, and minutes are set using the keypad routine 136 for each. Thereafter, the clock setting routine 143 terminates at 148 with the clock region of the menu bar 48 flashing, waiting for further cycling through the menu bar 48. In contrast, the clock initialization routine 126 goes to the OFF state 138 and waits for the menu routine 133 to be entered.

The keypad routine 136 (FIG. 14) is a routine which is called by other routines to read user input through the switches 32–34. The keypad routine 136 is context sensitive in that the response to a given key press depends on the current state of the program 56. Generally, the decrement and increment switches are menu cycle switches which cycle among menus or among selections or parameters within a menu, while the set switch 34 selects a menu or a parameter within a menu. The switches 32–34 have other functions which will be detailed below. The decrement switch 32 moves the cursor (usually a flashing icon on the display 31) to the left or downward or decrements a program counter. The increment switch 33 moves the cursor to the right or upward or increments a program counter. The set switch 34 accepts a displayed move or causes a number or state to be stored.

Before the keypad routine 136 actually reads actions from the switches 32–34, it first checks at 190 to determine if the control module 3 is in the system cabinet 2. If so, the routine 136 enters the main keypad routine 191 which includes the module in box test block 190. If the module 3 is not in the cabinet 2, a test at 192 is conducted to determine if the module 3 is connected to a PC 95 by checking the DB-15 connector 25/26 for the presence of the adapter cable 96 (PC COM LEAD). Thereafter, a battery test 165 is conducted. If either the adapter cable 96 is absent or the batteries 37 are low, control is returned to the main keypad routine 191. Otherwise, the routine 136 loops between a check at 193 for a command from the PC 95 and a test at 194 for the presence of the adapter cable 96. When a command is received from the PC 95, the processor 52 responds using the module communication routine 99. When the adapter cable test fails at 194, the routine 136 exits to the OFF state 138.

The AUTO routine 140 (FIG. 16) generally initiates the automatic running of previously entered programs. The control program provides for three independent programs labeled A, B, and C. Each independent program allows three different starting times. The variety and number of preset watering programs which can be set up allows for variations in rainfall throughout a season, changes in activity from day to day throughout a week, the invocation of water conservation ordinances, such as odd/even schemes, and the like. Additionally, the control program 56 checks the entered programs and resolves conflicts in programming, such as starting times which overlap previously running durations by delaying the later starting time until the current watering zone would be completed. The corrected programming scheme is referred to herein as a program stack.

Figure 16:
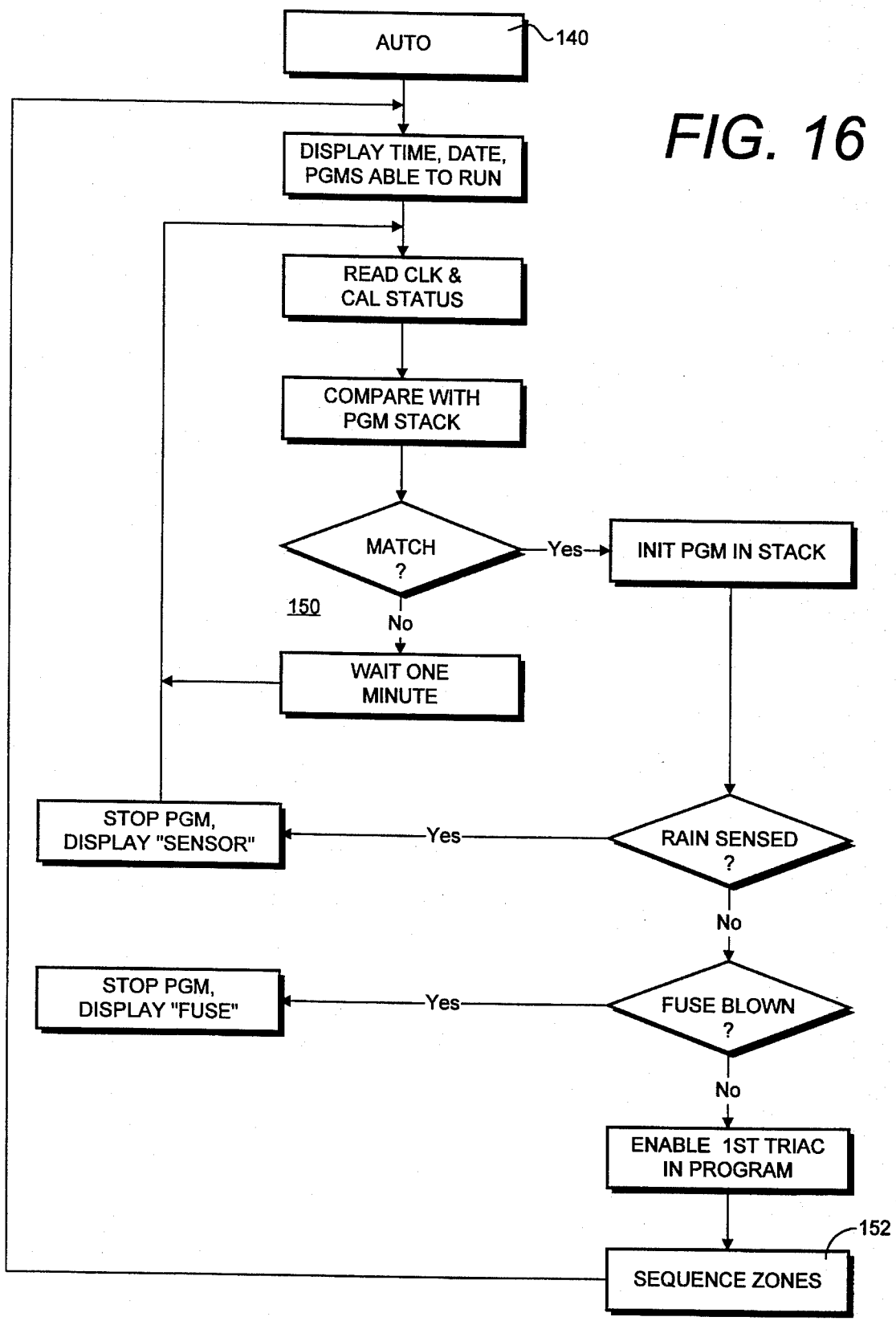
FIG. 16 is a flow diagram illustrating an AUTO routine for automatic running of previously entered watering programs.
Figure 17:
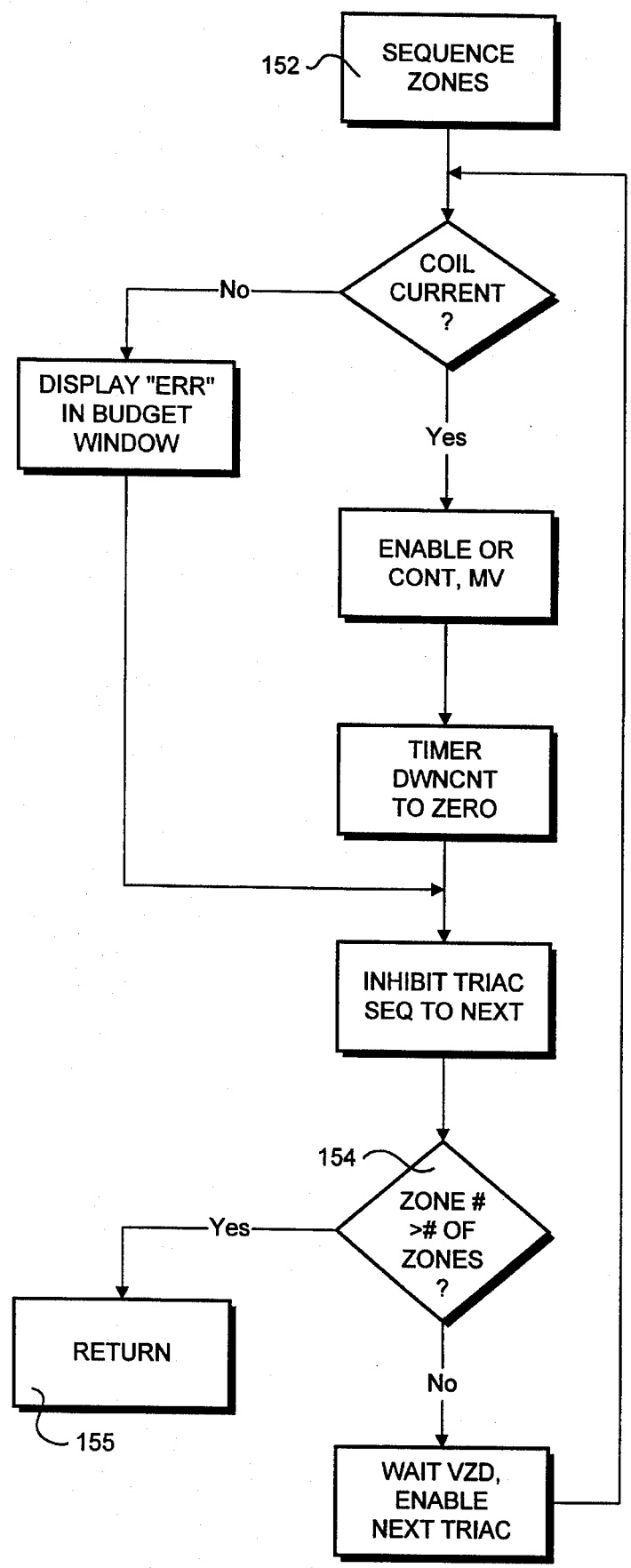
FIG. 17 is a flow diagram illustrating a zone sequencing routine for sequencing enablement to the watering zones of an irrigation sprinkler system.

Referring to FIG. 16, the current time and date are displayed along with all programs able to run, and a repeating one minute program compare loop 150 is entered. In the loop 150, the clock and calendar registers are read and compared with the program stack. When a match is found, it is time to run a program, and the loop 150 is exited and the rain sensor checked. If rain is sensed, the loop 150 is re-entered. If not, the fuse 82 is checked. If the fuse 82 has blown, the program is stopped and the FUSE element of the sensor region 46 of the display 31 is activated. If the fuse 82 is intact, the triac of the first zone to be watered in the current program is enabled, and a "sequence zones" or triac sequencing routine 152 (FIG. 17) is called.

In the sequence zones routine 152, a coil current test is conducted by the phase shift measurement described above. If coil current is sensed, the master valve 89 is activated or left activated, and a timer is counted down for the programmed zone watering duration. Each zone watering duration can be individually programmed. If either coil current is not sensed or the current zone watering duration has completed, the current triac is inhibited, and the program sequences to the next triac. At 154, a last zone test is conducted. After a zone delay has timed out, the next triac sequenced to is enabled, and the routine 152 loops back to the coil current test. After the last zone has been watered, the routine 152 returns control at 155 to the routine which called it. In the AUTO routine 140, the time, date, and available programs are displayed, and the program compare loop 150 is re-entered.

Figure 18:
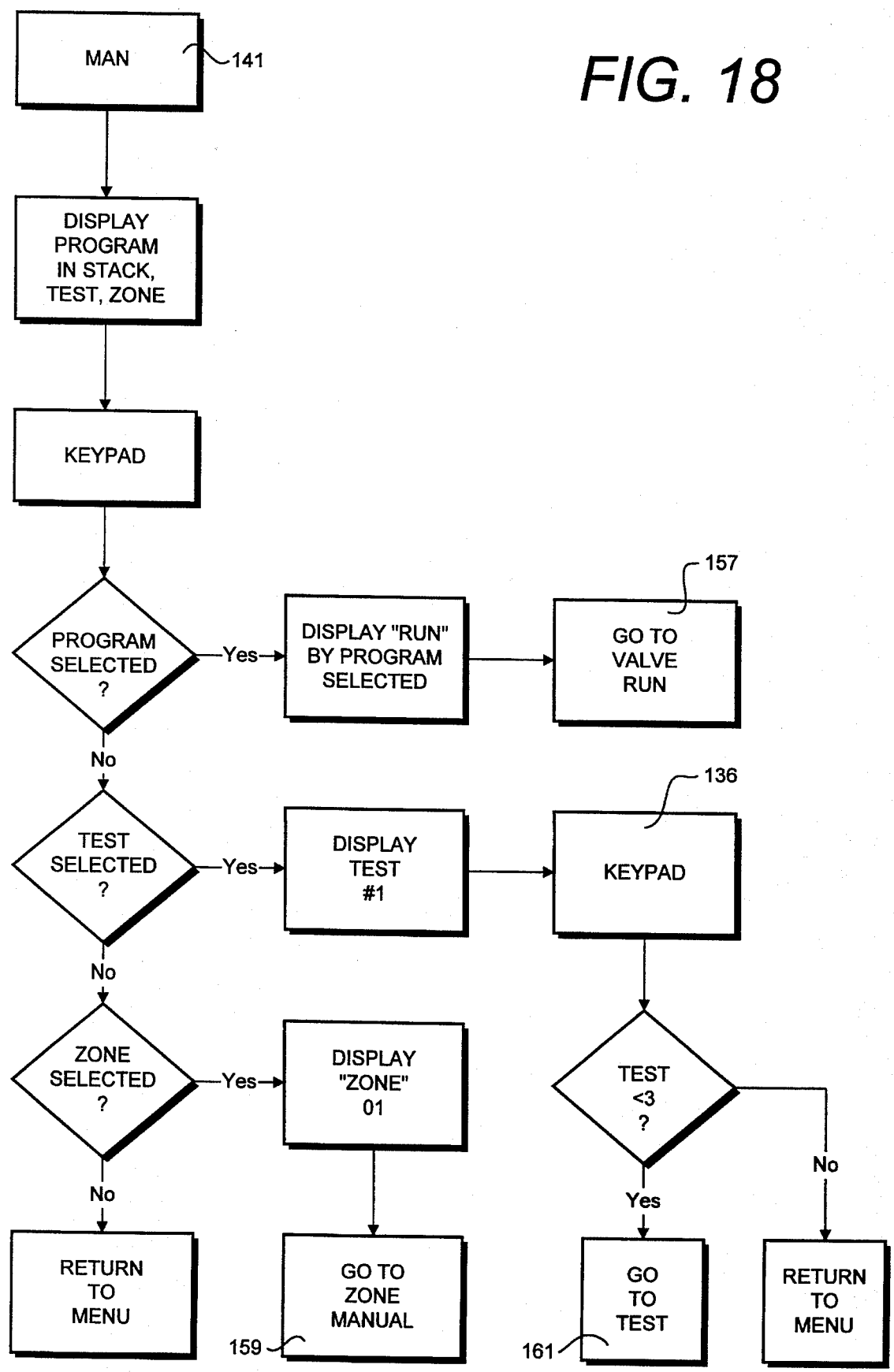
FIG. 18 is a flow diagram illustrating a MAN or manual routine for entry into several manually initiated sprinkler valve control routines.

FIG. 18 illustrates the MAN or manual program 141. The MAN program 141 is a routine for selecting from a number of manually initiated or controlled routines, including a "valve run" routine 157 (FIG. 23) which allows manual initiation of a preset program, a "zone manual" routine 159 (FIG. 24) which allows manually initiated watering in a single irrigation zone, or a test routine 161 (FIG. 27) which allows the user to conduct several configurations of tests of a preset program. The manual modes are not available when AC power is not present. If power fails while in a manual mode, the current routine is aborted. Also, the manual modes do not check or respond to signals from the rain sensor.

Figure 19:
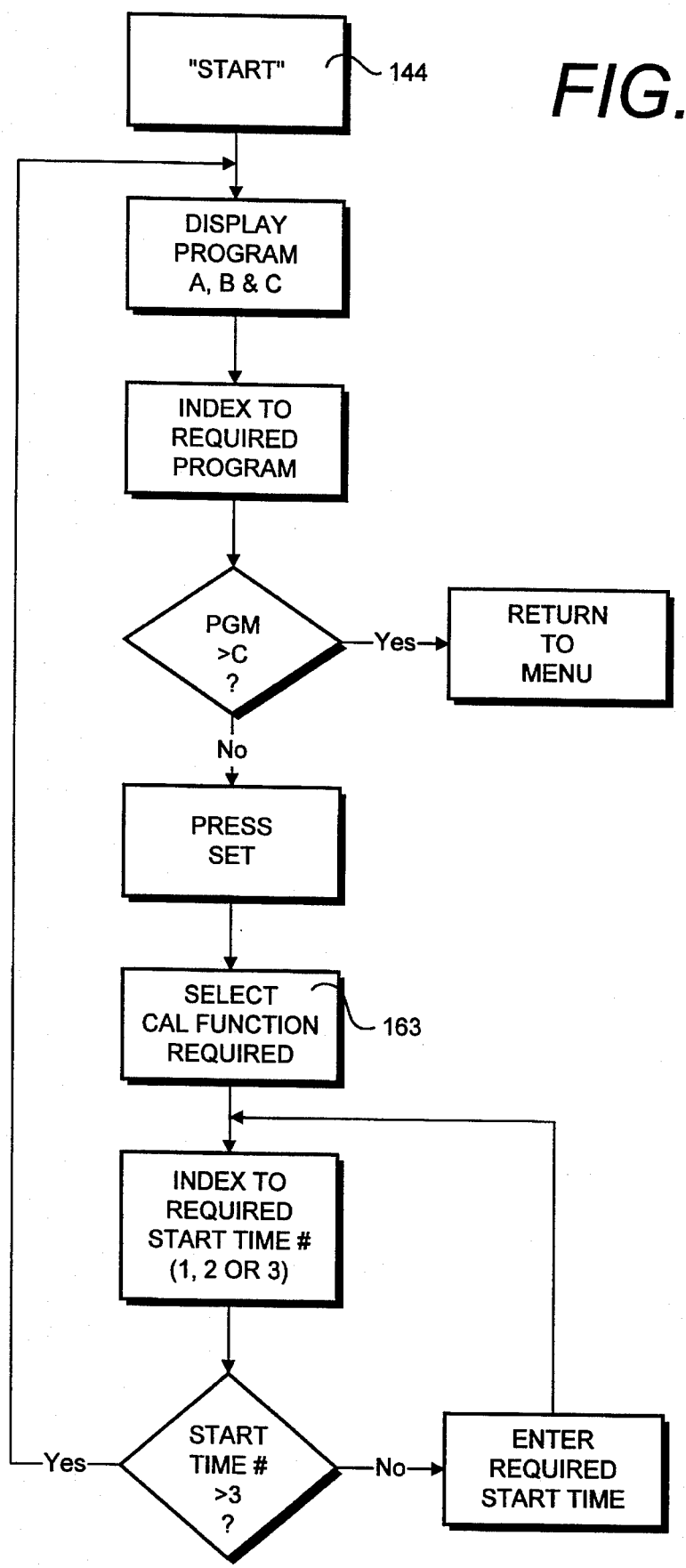
FIG. 19 is a flow diagram illustrating a START routine for entering start times for a plurality of independent watering programs of which the system is capable.

FIG. 19 is the "start" routine 144 which allows a user to set up to three starting times for each of the programs A, B, and/or C. Additionally, the start routine 144 enables the user to set up the desired days on which the programs execute, using the calendar function (CAL FCTN) step 163.

Figure 20:
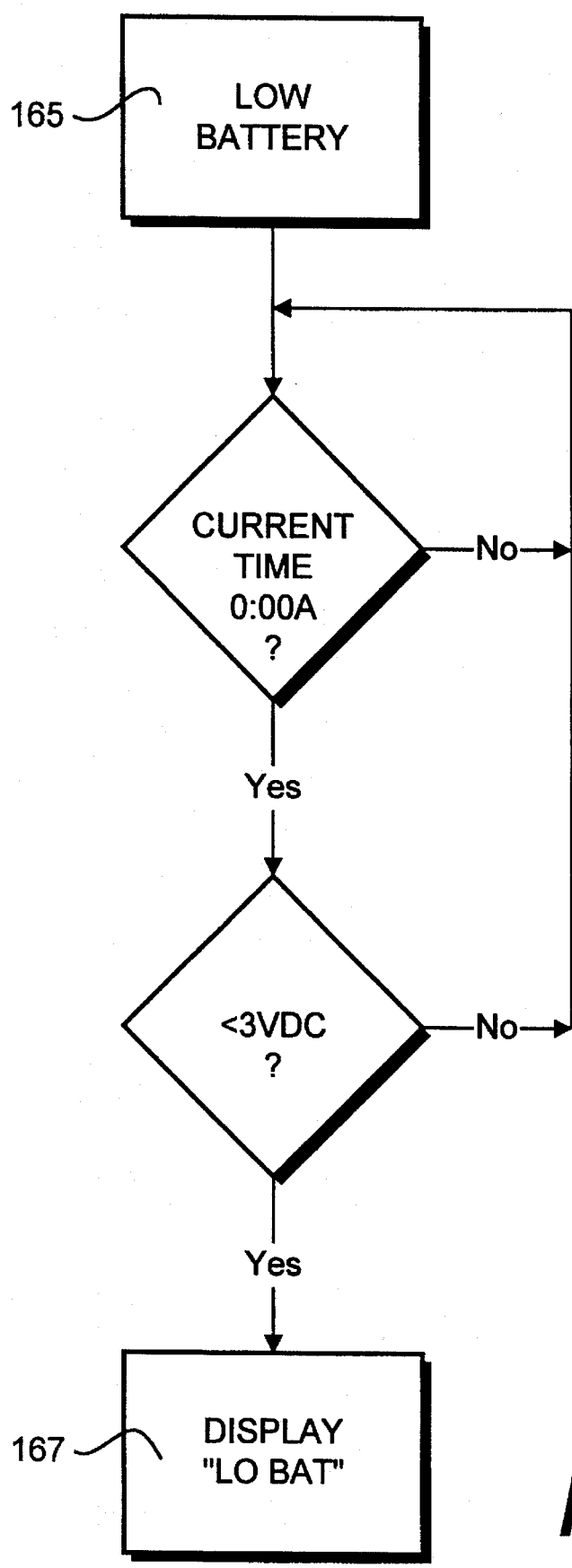
FIG. 20 is a flow diagram illustrating is a battery test routine of the system.

FIG. 20 illustrates a low battery routine 165 in which the voltage of the batteries 37 is checked using the low battery sensor circuit 60 (FIG. 7). The low battery routine 165 is executed at midnight (0:00A) and if the measured voltage is less than three volts, a low battery (LO BAT) indicator (not shown) is activated on the display 31 at 167. The display 31 then alternates between the low battery indicator for one out of five seconds, with the normal display for the remainder of the cycle. The control module 3 will continue to function at a voltage lower than three volts; however, the processor 52 will cease to function properly as the battery voltage drops. Therefore, the user is advised to check the display periodically for the low battery indication 167.

Figure 21:
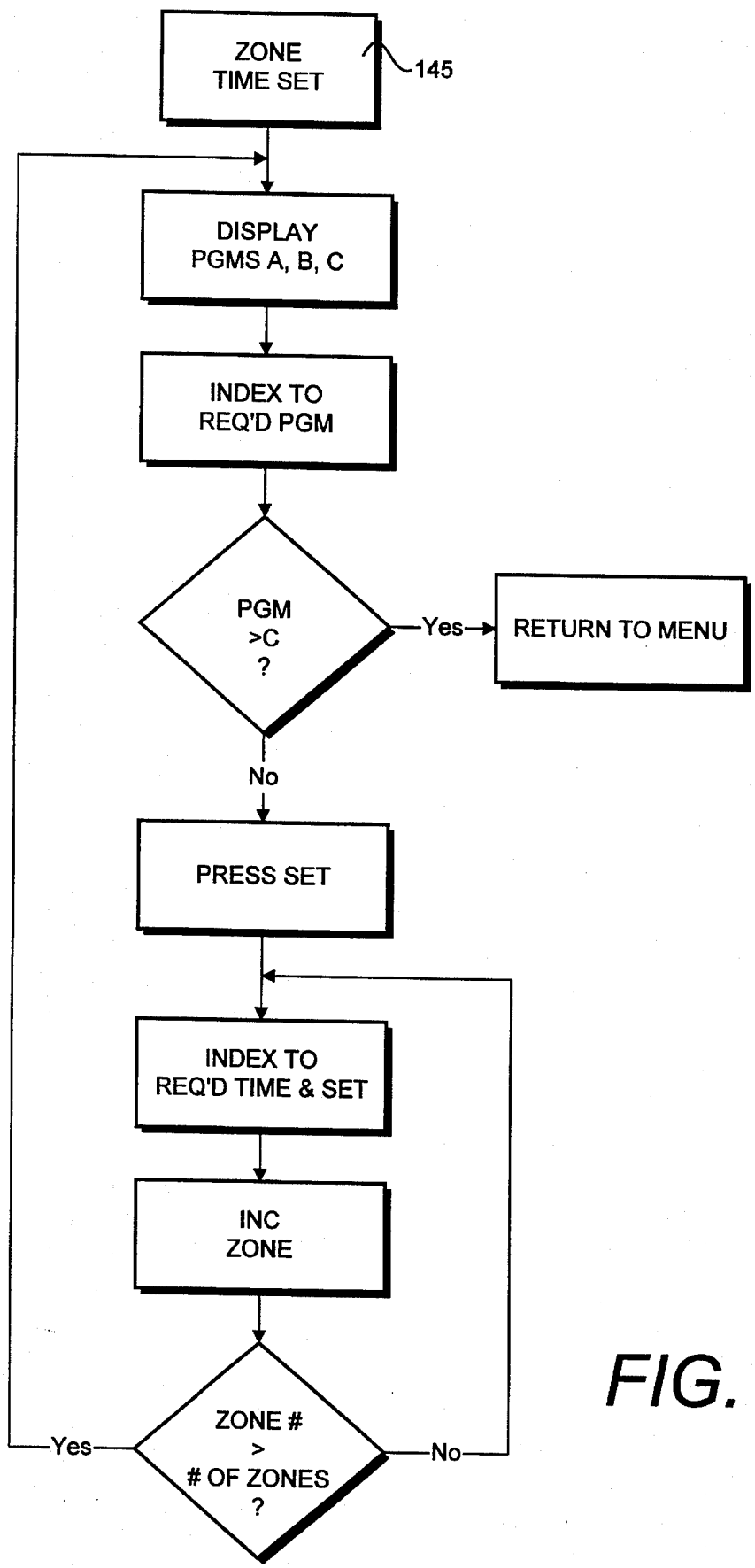
FIG. 21 is a flow diagram illustrating a zone time set routine of the system which enables the entry of watering zone durations for the independent watering programs.
Figure 22:
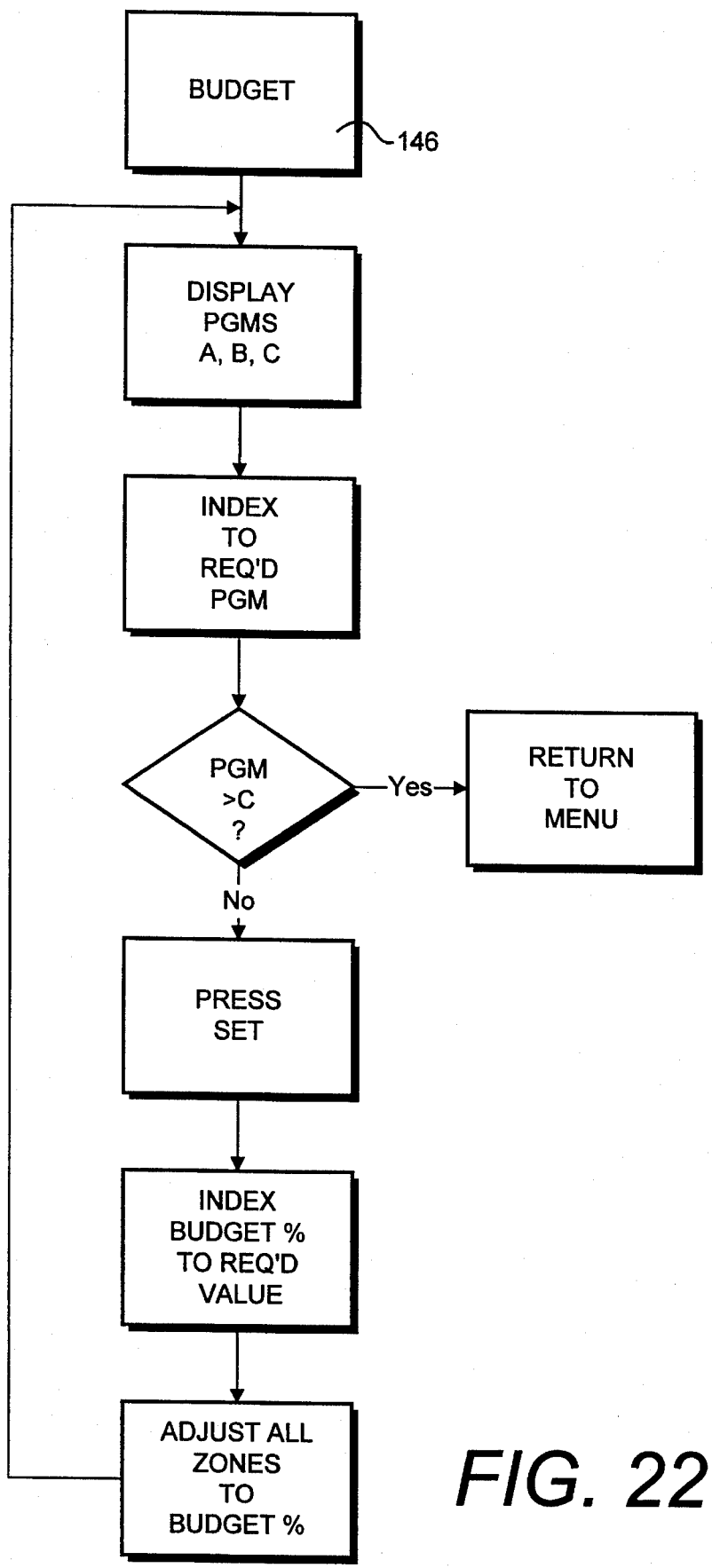
FIG. 22 is a flow diagram illustrating a budget routine of the system which enables selective variation by percentages of the watering durations of an independent watering program.

FIG. 21 illustrates the zone time set routine 145 which enables the user to program watering durations individually for each zone, in each of the programs A, B, and C. FIG. 22 illustrates the budget routine 146 which allows the user to vary all the durations for a program A, B, or C by a selectable percentage. Thus, if a previously set program is overwatering or underwatering, or if rainfall is occasionally occurring, the watering durations can be adjusted to compensate for such factors without the necessity of reprogramming the control module 3. The stored zone durations are not altered. Instead, at run time, the zone durations are multiplied by the budget percentage and rounded to the nearest whole minute.

Figure 23:
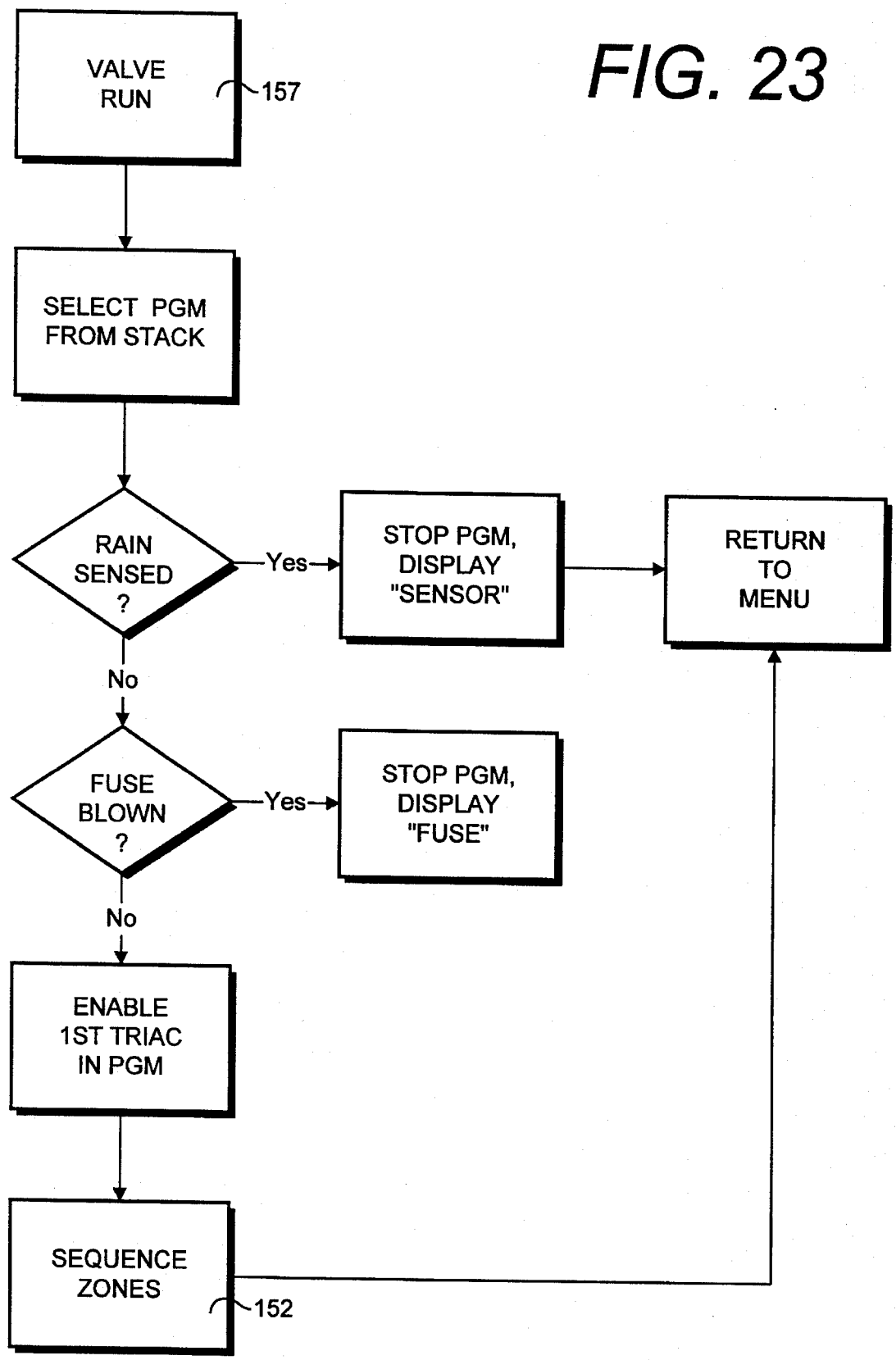
FIG. 23 is a flow diagram illustrating a valve run routine of the system which enables manual initiation of one of the preset independent watering programs.

FIG. 23 illustrates the "valve run" routine 157 which allows a user to manually start a preset program A, B, or C. The valve run routine 157 operates similar to the AUTO routine 140, but allows the user to manually select a program, rather than execute a program in response to a match between the current time and a program stack starting time.

Figure 24:
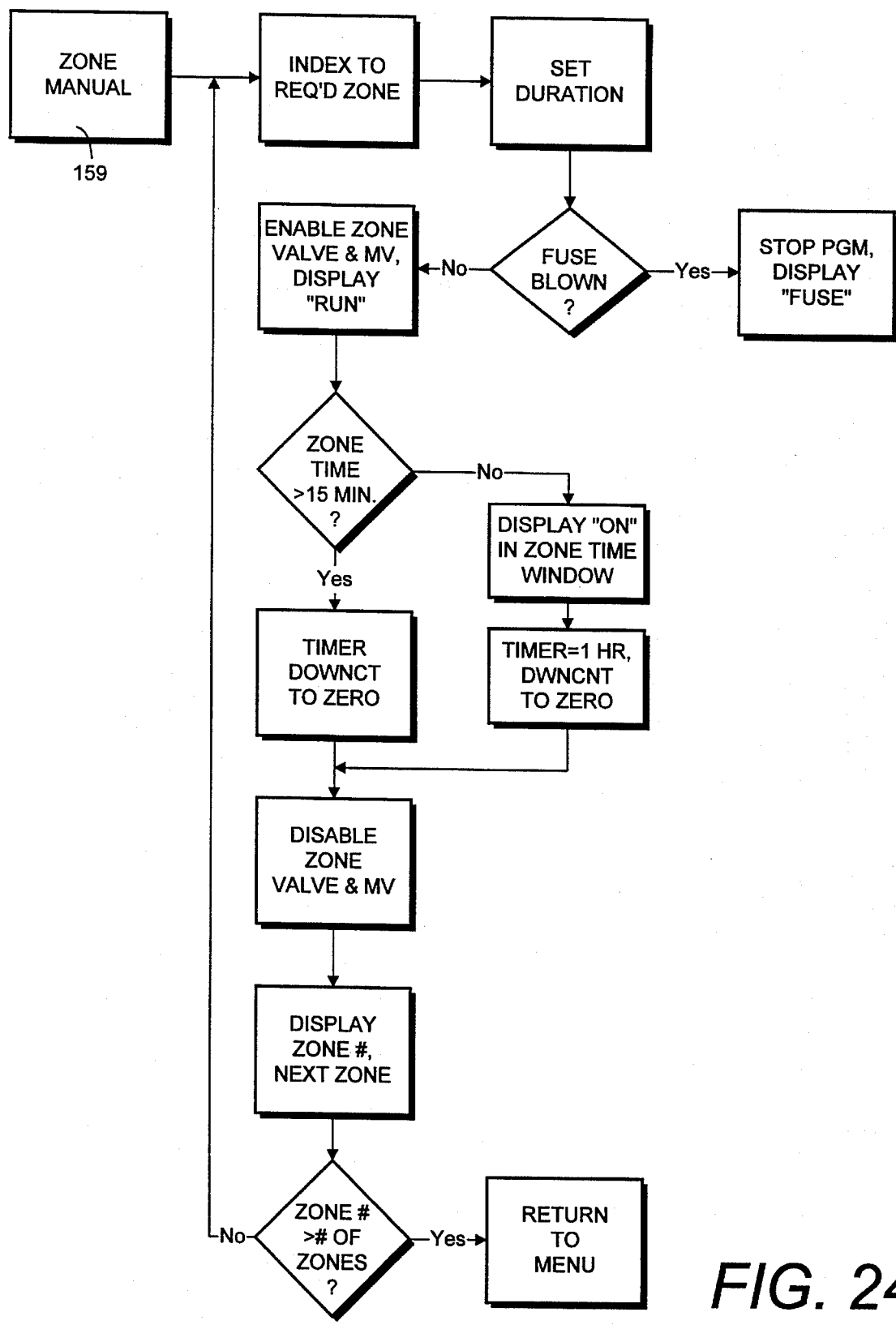
FIG. 24 is a flow diagram illustrating zone manual routine of the system which enables manually initiated irrigation of a single watering zone.

FIG. 24 illustrates the zone manual routine 159 which allows a user to manually water a selected irrigation zone by selecting a single watering zone, setting a watering duration for the zone, and initiating the set watering cycle.

Figure 25:
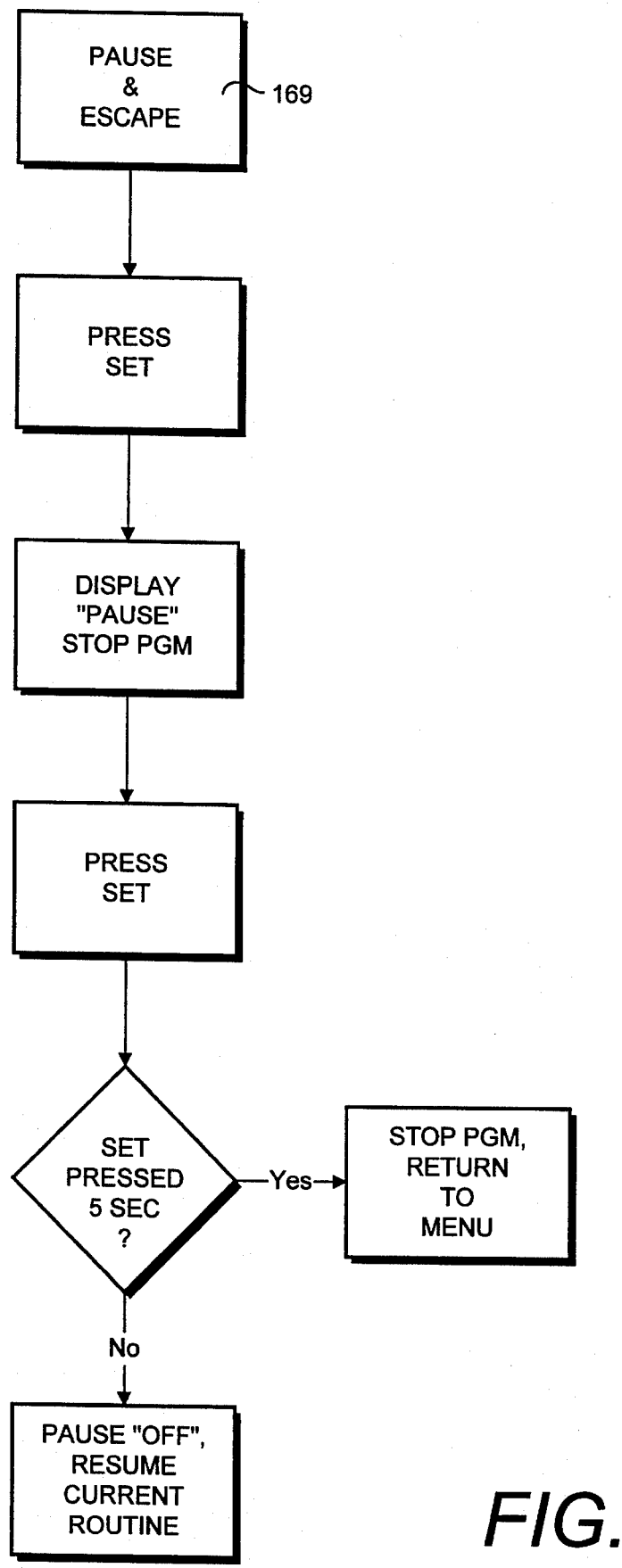
FIG. 25 is a flow diagram illustrating a pause and escape routine of the system which enables exiting from any of the routines of the control program except communication with a personal computer.

FIG. 25 illustrates a pause and escape routine 169 which allows a user to suspend the current routine. The pause and escape routine 169 is entered by pressing the set button 34. The "pause" indicator on the indicator region 46 of the display 31 is activated and, if the set button 34 is pressed for five seconds, the current program is suspended, and the menu routine 133 is entered. If the set button 34 is pressed for less than five seconds, the "pause" indicator is deactivated, and the currently executing routine is resumed. The pause and escape routine 169 cannot be entered when the control module 3 is connected to a PC 95 since the detected presence of a connection to a PC 95 disables detection of operations of the key switches 32–34.

Figure 26:
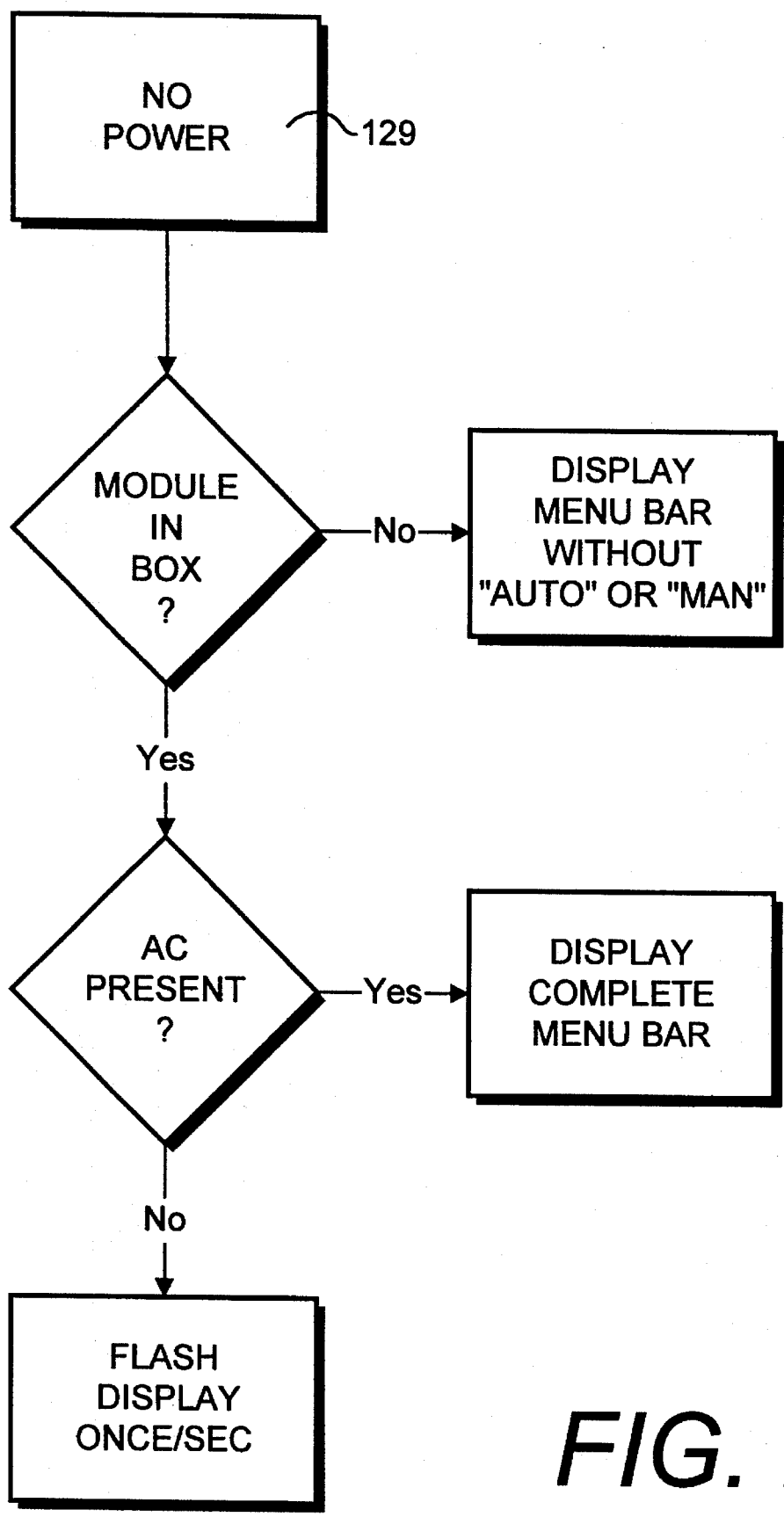
FIG. 26 is a flow diagram illustrating a no-power routine of the system which controls entry into the automatic and manual control menus if the control module is not present in the system cabinet or valve actuation power is not available.

FIG. 26 illustrates the "no power" routine 129. If the control module 3 is not present in the system cabinet 2, the menu bar 48 of the display 31 is displayed without the AUTO or MAN regions activated. If the control module 3 is present in the system cabinet 2 and AC power is present, as indicated by the mains signal line 64, the complete menu bar 48 is displayed on the display 31. If AC power is not present, the display 31 is flashed once per second.

Figure 27:
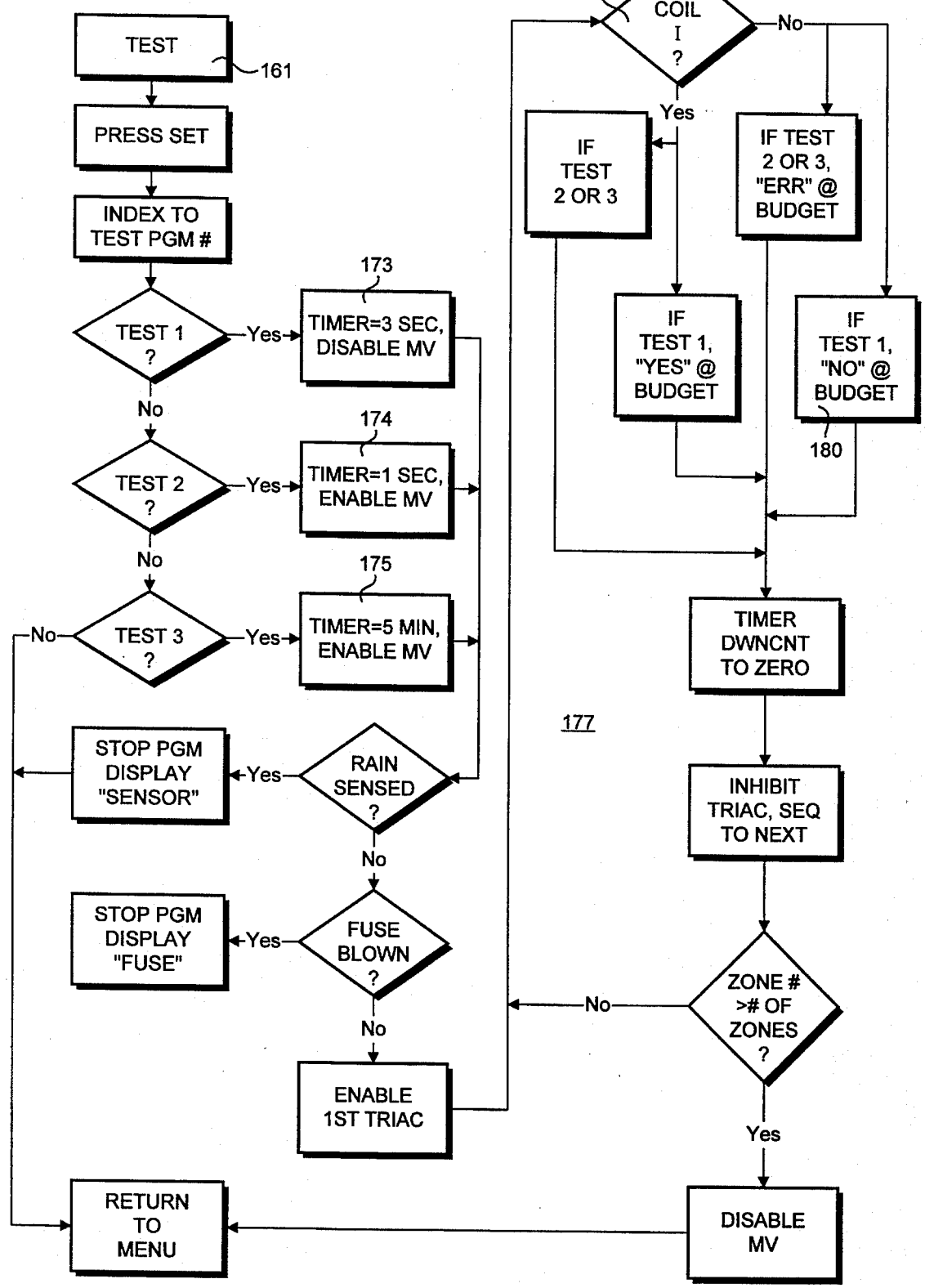
FIG. 27 is a flow diagram illustrating a test routine of the system which enables initiation of several modes of testing preset programs.

FIG. 27 illustrates the test routine 161 which, in the illustrated program 56, provides three variations for testing a preset program. The first test at 173 sets a timer to three seconds and disables the master valve 89. The second test at 174 sets the timer to one minute and enables the master valve 89. The third test at 175 sets the timer to five minutes and enables the master valve. Once the desired test is selected, and the timer and master valve 89 set accordingly, the routine 161 functions in a manner similar to the AUTO routine 140 or MAN routine 141 with a modified "sequence zones" loop 177. The modified sequence zones loop 177 differs from the standard sequence zones routine 152 in that if coil current is sensed at 178, at 179 a YES indicator in the budget region of the menu bar 48 is activated. If coil current is not sensed, at 180 a NO indicator is activated. The second and third tests 174 and 175 allow water to flow through the valves 4 or 107 as their valves are sequenced for visual confirmation. The first test 173 is a dry test run. When the last programmed zoned has been sequenced through, the master valve 89 is disabled, and control is returned to the menu routine 133.

Figure 28:
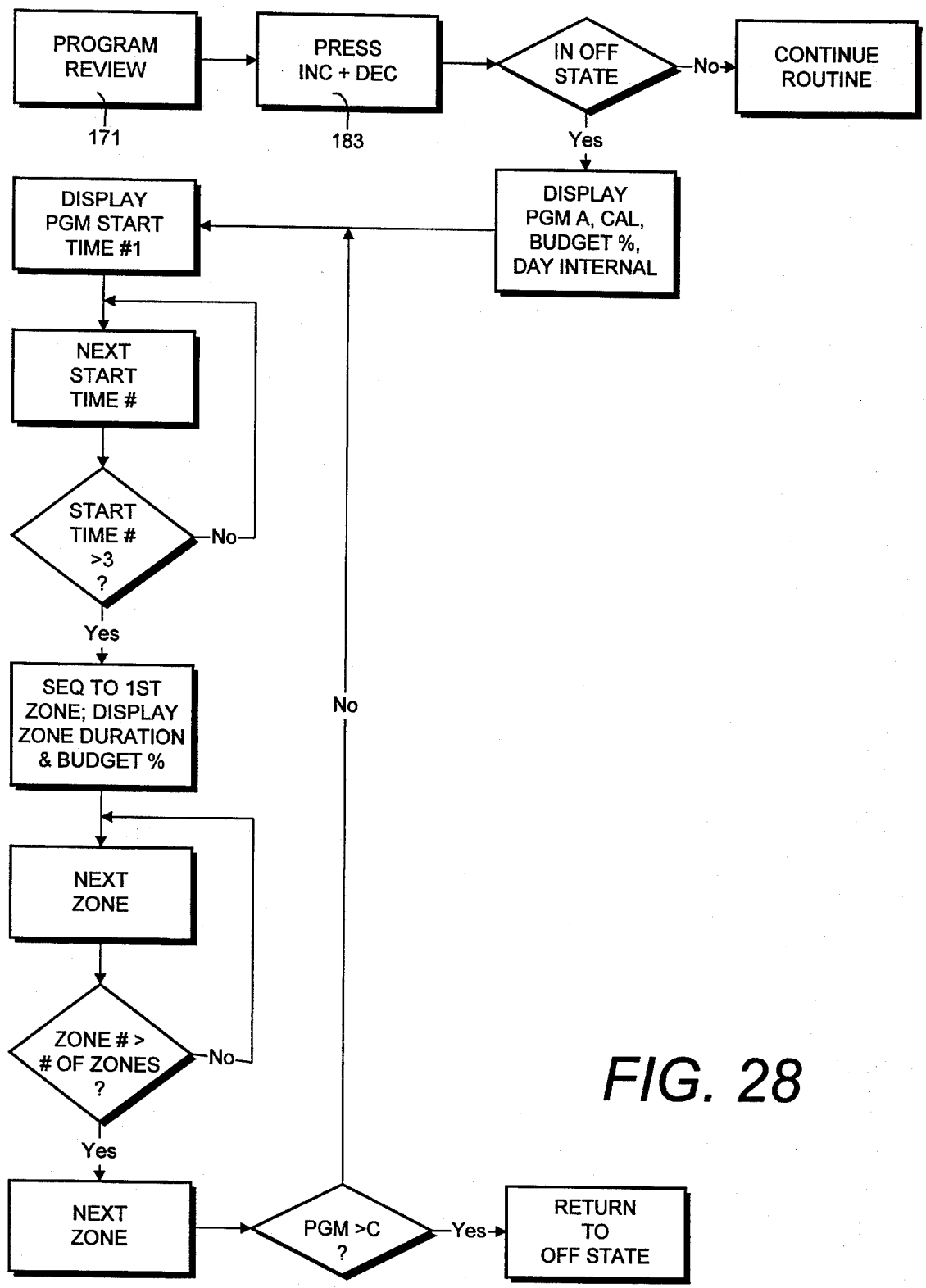
FIG. 28 is a flow diagram illustrating a program review routine of the system which enables preset independent watering programs to be reviewed.

FIG. 28 illustrates the program review routine 171 which allows a user to single step through any or all of the preset programs A, B, and/or C. The program review routine 171 is entered by pressing the increment and decrement buttons 33 and 34 simultaneously at 183. The program review routine 171 can only be entered from the OFF state 138. In all other routines, simultaneous pressing of the buttons 33 and 34 is ignored. The program review routine 171 can be exited at any time by entering the pause and escape routine 169. When the last preset program has been reviewed, the routine 171 enters the OFF state 138.

It is to be understood that while certain forms of the present invention have been illustrated and described herein, it is not to be limited to the specific forms or arrangement of parts described and shown.

What is claimed and desired to be secured by Letters Patent is as follows:

1. A programmable irrigation sprinkler controller module for controlling an irrigation sprinkler valve and comprising:

(a) a controller housing;

(b) an irrigation control processor mounted in said housing and including an input port, an output port, a display port, memory storing a menu based irrigation control program and irrigation control parameters, and a clock;

(c) a display device mounted in said housing and interfaced to said display port;

(d) a menu cycle switch operable to cycle among menus of said control program and to cycle among parameters within a current menu and a menu select switch operable to select a current menu and to select a parameter within a current menu, said switches being mounted on said housing and interfaced to said input port of said processor;

(e) said output port being adapted for interfacing to an irrigation sprinkler valve for control of said valve by the presence of a selected logic state on said output port;

(f) said switches and said display cooperating with said control program to display menus enabling selection of irrigation control parameters to provide a timed sequence of logic states on said output port by execution of said control program in cooperation with said clock; and (g) a battery mounted in said housing, coupled to said processor, and providing a sole source of operating power for said processor and said display.

2. A controller module as set forth in claim 1 and including:

(a) a battery mounted in said housing, coupled to said processor, and providing operating power for said processor and said display.

3. A controller module as set forth in claim 1 and including:

(a) a controlled valve driver device mounted in said housing and adapted to supply valve actuating power to a solenoid operated sprinkler valve upon said valve driver device being enabled, said valve driver device including a valve power input terminal, a valve power output terminal, and an enable terminal;

(b) said valve power input terminal being adapted for connection to a source of valve actuating power;

(c) said valve power output terminal being adapted for connection to a solenoid operated sprinkler valve; and (d) said enable terminal being adapted for connection to said output port of said processor whereby said selected logic state on said output port enables said valve driver device.

4. A controller module as set forth in claim 1 wherein said processor includes:

(a) a controller communication port configured for connection to a personal computer communication port whereby software operating within a personal computer having said personal computer communication port enables selection of said irrigation control parameters by operation of said personal computer.

5. A programmable irrigation sprinkler controller module for controlling a plurality of irrigation sprinkler valves and comprising:

(a) a controller housing;

(b) an irrigation control processor mounted in said housing and including a plurality of input/output ports, memory storing a menu based irrigation control program and irrigation control parameters, and a real time clock/calendar;

(c) a display device mounted in said housing and interfaced to a display port of said processor;

(d) a battery mounted in said housing, coupled to said processor, and providing a sole source of operating power for said processor and said display;

(e) a menu increment switch, a menu decrement switch, and a menu select switch mounted on said housing and interfaced to a switch port of said processor, said menu increment switch and said menu decrement switch being operable to cycle among menus of said program and to cycle among parameters within a current menu, and said menu select switch being operable to select a current menu and to select a parameter within a current menu;

(f) one of said input/output ports of said processor being configured as a multiple line valve control port adapted for interfacing to a plurality of irrigation sprinkler valves for control of said valves by the presence of selected logic states on respective lines said valve control port; and (g) said switches and said display cooperating with said control program to display menus enabling selection of irrigation control parameters to provide a timed sequence of logic states on said valve control port by execution of said control program in cooperation with said clock/calendar.

6. A programmable irrigation sprinkler controller for controlling an irrigation sprinkler valve and comprising:

(a) a controller housing;

(b) an irrigation control processor mounted in said housing and including an input port, an output port, a display port, memory storing a menu based irrigation control program and irrigation control parameters, and a clock;

(c) a display device mounted in said housing and interfaced to said display port;

(d) a menu cycle switch operable to cycle among menus of said control program and to cycle among parameters within a current menu and a menu select switch operable to select a current menu and to select a parameter within a current menu, said switches being mounted on said housing and interfaced to said input port of said processor;

(e) said output port being adapted for interfacing to an irrigation sprinkler valve for control of said valve by the presence of a selected logic state on said output port;

(f) said switches and said display cooperating with said control program to display menus enabling selection of irrigation control parameters to provide a timed sequence of logic states on said output port by execution of said control program in cooperation with said clock;

(g) said housing being portable and being configured to be removably received within an irrigation sprinkler controller cabinet;

(h) said cabinet having mounted therein a controlled valve driver device adapted to supply valve actuating power to a solenoid operated sprinkler valve upon said valve driver device being enabled, said valve driver device including a valve power input terminal, a valve power output terminal, and an enable terminal;

(i) said valve power input terminal being adapted for connection to a source of valve actuating power;

(j) said valve power output terminal being adapted for connection to a solenoid operated sprinkler valve; and (k) said enable terminal being connected to said output port of said processor when said housing is positioned within said cabinet whereby said selected logic state on said output port enables said valve driver device.

7. A programmable irrigation sprinkler controller for controlling a plurality of irrigation sprinkler valves and comprising:

(a) a controller housing;

(b) an irrigation control processor mounted in said housing and including a plurality of input/output ports, memory storing a menu based irrigation control program and irrigation control parameters, and a real time clock/calendar;

(c) a display device mounted in said housing and interfaced to a display port of said processor;

(d) a battery mounted in said housing, coupled to said processor, and providing operating power for said processor and said display;

(e) a menu increment switch, a menu decrement switch, and a menu select switch mounted on said housing and interfaced to a switch port of said processor, said menu increment switch and said menu decrement switch being operable to cycle among menus of said program and to cycle among parameters within a current menu, and said menu select switch being operable to select a current menu and to select a parameter within a current menu;

(f) one of said input/output ports of said processor being configured as a multiple line valve control port adapted for interfacing to a plurality of irrigation sprinkler valves for control of said valves by the presence of selected logic states on respective lines said valve control port;

(g) said switches and said display cooperating with said control program to display menus enabling selection of irrigation control parameters to provide a timed sequence of logic states on said valve control port by execution of said control program in cooperation with said clock/calendar;

(h) a valve power transformer, adapted for connection to a source of electrical power, and having a transformer output providing sprinkler valve operating power;

(i) a plurality of controlled valve driver devices mounted in said housing and adapted to supply valve actuating power to a plurality of solenoid operated sprinkler valves upon a respective valve driver device being enabled, each valve driver device including a valve power input terminal, a valve power output terminal, and an enable terminal;

(j) each valve power input terminal being coupled to said transformer output;

(k) each valve power output terminal being adapted for connection to a solenoid operated sprinkler valve; and (l) each enable terminal being coupled to a respective line of said output port of said processor whereby said selected logic state on a line of said output port enables a respective valve driver device to transfer valve operating power from said power transformer to a valve connected to said valve driver device.

8. A controller as set forth in claim 7 and including:

(a) said processor including a multiple line expansion port adapted for interfacing to a second plurality of irrigation sprinkler valves, in addition to the first named plurality of valves, for control of the second plurality of valves by the presence of selected logic states on respective lines of said expansion port;

(b) a plurality of controlled expansion valve drivers mounted in said housing and adapted to supply valve actuating power to a second plurality of solenoid operated sprinkler valves upon a respective expansion valve driver being enabled, each expansion valve driver including an expansion driver power input terminal, an expansion driver power output terminal, and an expansion driver enable terminal;

(c) each expansion driver power input terminal being coupled to said transformer output;

(d) each expansion driver power output terminal being adapted for connection to a respective solenoid operated sprinkler valve of said second plurality; and (e) each expansion driver enable terminal being coupled to a respective line of said expansion port whereby said selected logic state on a line of said expansion port enables a respective expansion valve driver to transfer valve operating power from said power transformer to a valve connected to said expansion valve driver.

9. A programmable irrigation sprinkler controller for controlling a plurality of irrigation sprinkler valves and comprising:

(a) a controller housing;

(b) an irrigation control processor mounted in said housing and including a plurality of input/output ports, memory storing a menu based irrigation control program and irrigation control parameters, and a real time clock/calendar;

(c) a display device mounted in said housing and interfaced to a display port of said processor;

(d) a battery mounted in said housing, coupled to said processor, and providing operating power for said processor and said display;

(e) a menu increment switch, a menu decrement switch, and a menu select switch mounted on said housing and interfaced to a switch port of said processor, said menu increment switch and said menu decrement switch being operable to cycle among menus of said program and to cycle among parameters within a current menu, and said menu select switch being operable to select a current menu and to select a parameter within a current menu;

(f) one of said input/output ports of said processor being configured as a multiple line valve control port adapted for interfacing to a plurality of irrigation sprinkler valves for control of said valves by the presence of selected logic states on respective lines said valve control port;

(g) said switches and said display cooperating with said control program to display menus enabling selection of irrigation control parameters to provide a timed sequence of logic states on said valve control port by execution of said control program in cooperation with said clock/calendar;

(h) said housing being portable and being configured to be removably received within an irrigation sprinkler cabinet;

(i) a valve power transformer, adapted for connection to a source of electrical power, and having a transformer output providing sprinkler valve operating power;

(j) a plurality of controlled valve driver devices mounted in said cabinet and adapted to supply valve actuating power to a plurality of solenoid operated sprinkler valves upon a respective valve driver device being enabled, each valve driver device including a valve power input terminal, a valve power output terminal, and an enable terminal;

(k) each valve power input terminal being coupled to said transformer output;

(l) each valve power output terminal being adapted for connection to a solenoid operated sprinkler valve; and (m) each enable terminal being connected to a respective line of said output port of said processor when said housing is received within said cabinet whereby said selected logic state on a line of said output port enables a respective valve driver device to transfer valve operating power from said power transformer to a valve connected to said valve driver device.

10. A controller as set forth in claim 9 and including:

(a) said processor including a multiple line expansion port adapted for interfacing to a second plurality of irrigation sprinkler valves, in addition to the first named plurality of valves, for control of the second plurality of valves by the presence of selected logic states on respective lines of said expansion port;

(b) a plurality of controlled expansion valve drivers mounted in said cabinet and adapted to supply valve actuating power to a second plurality of solenoid operated sprinkler valves upon a respective expansion valve driver being enabled, each expansion valve driver including an expansion driver power input terminal, an expansion driver power output terminal, and an expansion driver enable terminal;

(c) each expansion driver power input terminal being coupled to said transformer output;

(d) each expansion driver power output terminal being adapted for connection to a respective solenoid operated sprinkler valve of said second plurality; and (e) each expansion driver enable terminal being coupled to a respective line of said expansion port whereby said selected logic state on a line of said expansion port enables a respective expansion valve driver to transfer valve operating power from said power transformer to a valve connected to said expansion valve driver.

* * * * *